(12) United States Patent
del Toro et al.

(10) Patent No.: US 9,336,161 B2
(45) Date of Patent: May 10, 2016

(54) KEYBOARD-VIDEO-MOUSE SYSTEM AND METHOD OF PROVIDING AND USING THE SAME

(71) Applicant: Belkin International, Inc., Playa Vista, CA (US)

(72) Inventors: Carlos del Toro, Whittier, CA (US); Chad Singer, Santa Monica, CA (US); Abraham Camacho, West Hollywood, CA (US); Jake Diner, Redondo Beach, CA (US); Mauricio Chacon, Fountain Valley, VA (US); Robert Jeng, Torrance, CA (US); Adam Belmonte, Beverly, MA (US)

(73) Assignee: BELKIN INTERNATIONAL, INC., Playa Vista, CA (US)

( * ) Notice: Subject to any disclaimer, the term of this patent is extended or adjusted under 35 U.S.C. 154(b) by 0 days.

(21) Appl. No.: 14/072,725

(22) Filed: Nov. 5, 2013

(65) Prior Publication Data

US 2014/0068119 A1    Mar. 6, 2014

Related U.S. Application Data

(63) Continuation of application No. PCT/US2012/036656, filed on May 4, 2012, and a continuation of application No. PCT/US2012/036663, filed on May 4, 2012.

(60) Provisional application No. 61/482,850, filed on May 5, 2011, provisional application No. 61/483,628, filed on May 6, 2011.

(51) Int. Cl.
*G06F 13/12* (2006.01)
*G06F 3/023* (2006.01)

(52) U.S. Cl.
CPC .............. *G06F 13/122* (2013.01); *G06F 3/023* (2013.01)

(58) Field of Classification Search
None
See application file for complete search history.

(56) References Cited

U.S. PATENT DOCUMENTS

| | | | |
|---|---|---|---|
| 2005/0066000 A1* | 3/2005 | Liaw et al. | 709/204 |
| 2005/0149738 A1 | 7/2005 | Targosky | |
| 2007/0283450 A1 | 12/2007 | Anson et al. | |
| 2008/0288677 A1 | 11/2008 | Kirshtein | |
| 2009/0037996 A1* | 2/2009 | Shiakallis | 726/9 |
| 2009/0164675 A1* | 6/2009 | Chen et al. | 710/64 |
| 2009/0193171 A1 | 7/2009 | Ichikawa | |
| 2010/0318717 A1* | 12/2010 | Batish et al. | 710/316 |
| 2011/0072175 A1* | 3/2011 | Liaw et al. | 710/73 |
| 2011/0208963 A1* | 8/2011 | Soffer | 713/168 |

OTHER PUBLICATIONS

International Search Report and The Written Opinion for application PCT/US2012/036656 dated Nov. 23, 2012.
International Search Report and The Written Opinion for application PCT/US2012/036663 dated Nov. 23, 2012.

* cited by examiner

*Primary Examiner* — Elias Mamo
(74) *Attorney, Agent, or Firm* — Bryan Cave LLP

(57) ABSTRACT

Some embodiments include keyboard-video-mouse systems. Other embodiments of related systems and methods are also disclosed.

20 Claims, 23 Drawing Sheets

Secure KVM Configuration

| Port | Name | Button Color | Card Reader |
|---|---|---|---|
| 1 ☑ On | Network 1 ▼ | Off ▼ | ☐ |
| 2 ☑ On | Network 2 ▼ | Off ▼ | ☐ |
| 3 ☑ On | Network 3 ▼ | Off ▼ | ☐ |
| 4 ☑ On | Network 4 ▼ | Off ▼ | ☐ |

[ Done ]

FIG. 9

Secure KVM Configuration

| Port | Name | Button Color | Card Reader |
|---|---|---|---|
| 1 ☑ On | Network 1 ▼ | Off ▼ | ☐ |
| 2 ☑ On | Network 2 ▼ | Off ▼ | ☐ |
| 3 ☐ On | --------- Port Disabled --------- | | |
| 4 ☑ On | Network 4 ▼ | Off ▼ | ☐ |

[Done]

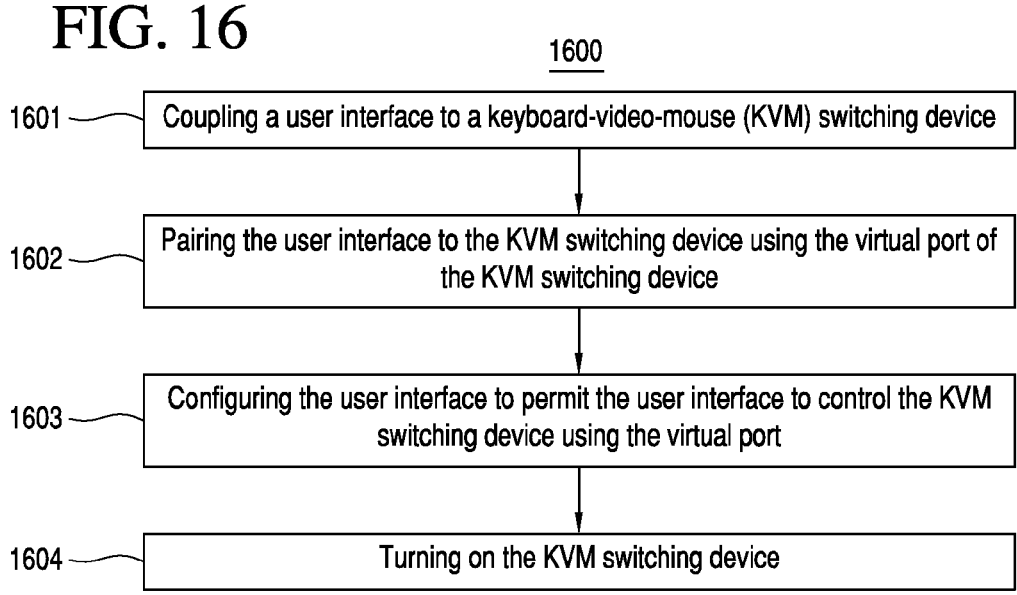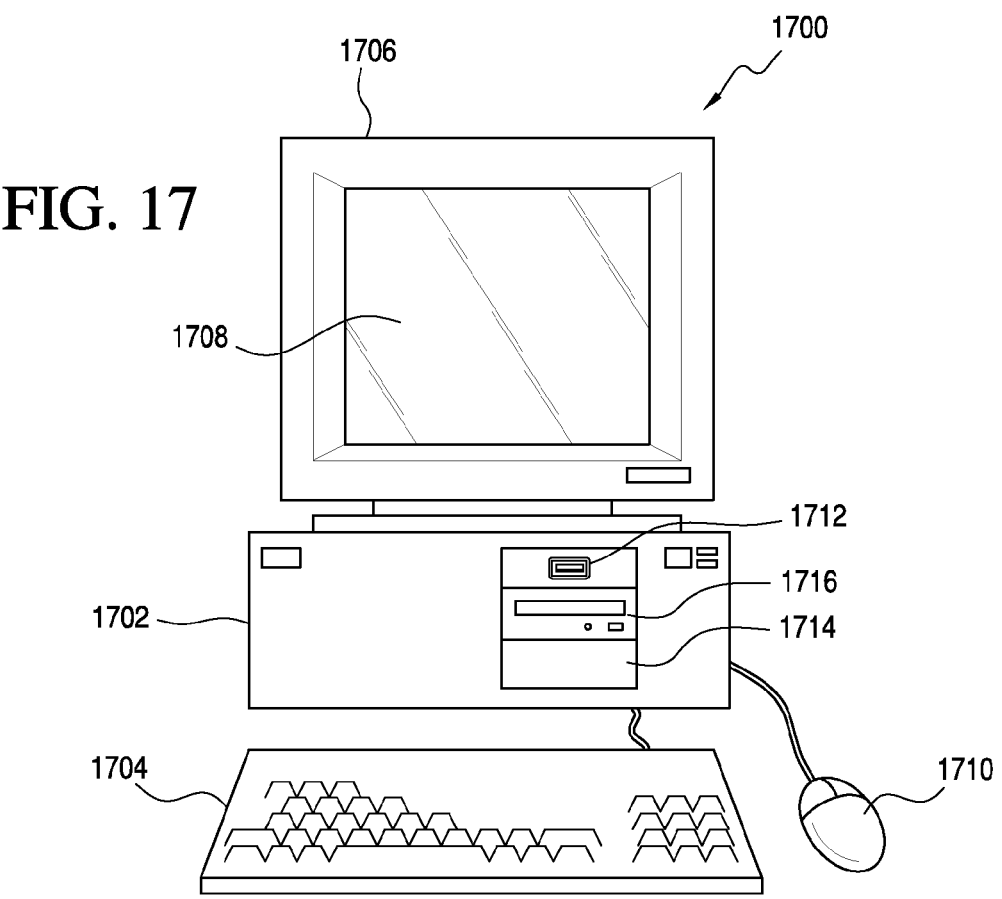

KEYBOARD-VIDEO-MOUSE SYSTEM AND METHOD OF PROVIDING AND USING THE SAME

CROSS-REFERENCE TO RELATED APPLICATIONS

This application is a continuation of International Patent Application No. PCT/US2012/036656, filed May 4, 2012, and International Patent Application No. PCT/US2012/036663, filed May 4, 2012. International Patent Application No. PCT/US2012/036656 claims the benefit of U.S. Provisional Patent Application No. 61/482,850, filed May 5, 2011, and International Patent Application No. PCT/US2012/036663 claims the benefit of U.S. Provisional Patent Application No. 61/483,628, filed May 6, 2011. International Patent Application No. PCT/US2012/036656, International Patent Application No. PCT/US2012/036663, U.S. Provisional Patent Application No. 61/482,850, and U.S. Provisional Patent Application No. 61/483,628 are incorporated herein by reference in their entirety.

FIELD OF THE INVENTION

This invention relates generally to keyboard-video-mouse systems, and relates more particularly to such systems having virtual ports to configure user interfaces of the systems and methods of providing and using the same.

DESCRIPTION OF THE BACKGROUND

Keyboard-video-mouse systems (i.e., systems employing a keyboard-video-mouse (KVM) switching device) represent a class of switching systems designed to provide user(s) centralized control and monitoring of one or more host computers from a control terminal (e.g., keyboard, monitor and mouse). The control terminal is frequently located remotely from the host computers. Through the KVM switching device, the user(s) can select and switch between the one or more host computers to operate the one or more host computers with the control terminal. The KVM switching device routes audio-visual data of the selected host computer to the control terminal so that the user(s) may view and/or listen to the audio-visual data at the control terminal. The KVM switching device also routes the signals from peripheral input devices of the control terminal (e.g., a keyboard and/or a mouse of the control terminal) to the respective peripheral input device ports of the selected host computer. From the host computer's perspective, it appears as if the control terminal's peripheral input devices are directly coupled to the host computer. The user(s) may select which host computer to operate from the control terminal with a user interface of the KVM system that is configured to control the KVM switching device.

Accordingly, a need or potential for benefit exists for an apparatus or system that can permit a user to pair a user interface with a KVM switching device and/or to configure the user interface to permit the user interface to control the KVM switching device.

BRIEF DESCRIPTION OF THE DRAWINGS

To facilitate further description of the embodiments, the following drawings are provided in which:

FIG. 9 illustrates an exemplary configuration module, which can be a type of switching device audio-visual data, according to the embodiment of FIG. 1;

FIG. 10 illustrates the exemplary configuration module of FIG. 9 where a physical port has been disabled;

FIG. 12 illustrates an exemplary customization window of the configuration module of FIG. 9 whereby the user(s) can customize the name of a physical port;

FIG. 16 illustrates a flow chart for an embodiment of a method;

FIG. 17 illustrates a computer that is suitable for implementing an embodiment of a computer system of FIG. 1 and/or of the virtual port of FIG. 2;

Figure 1:
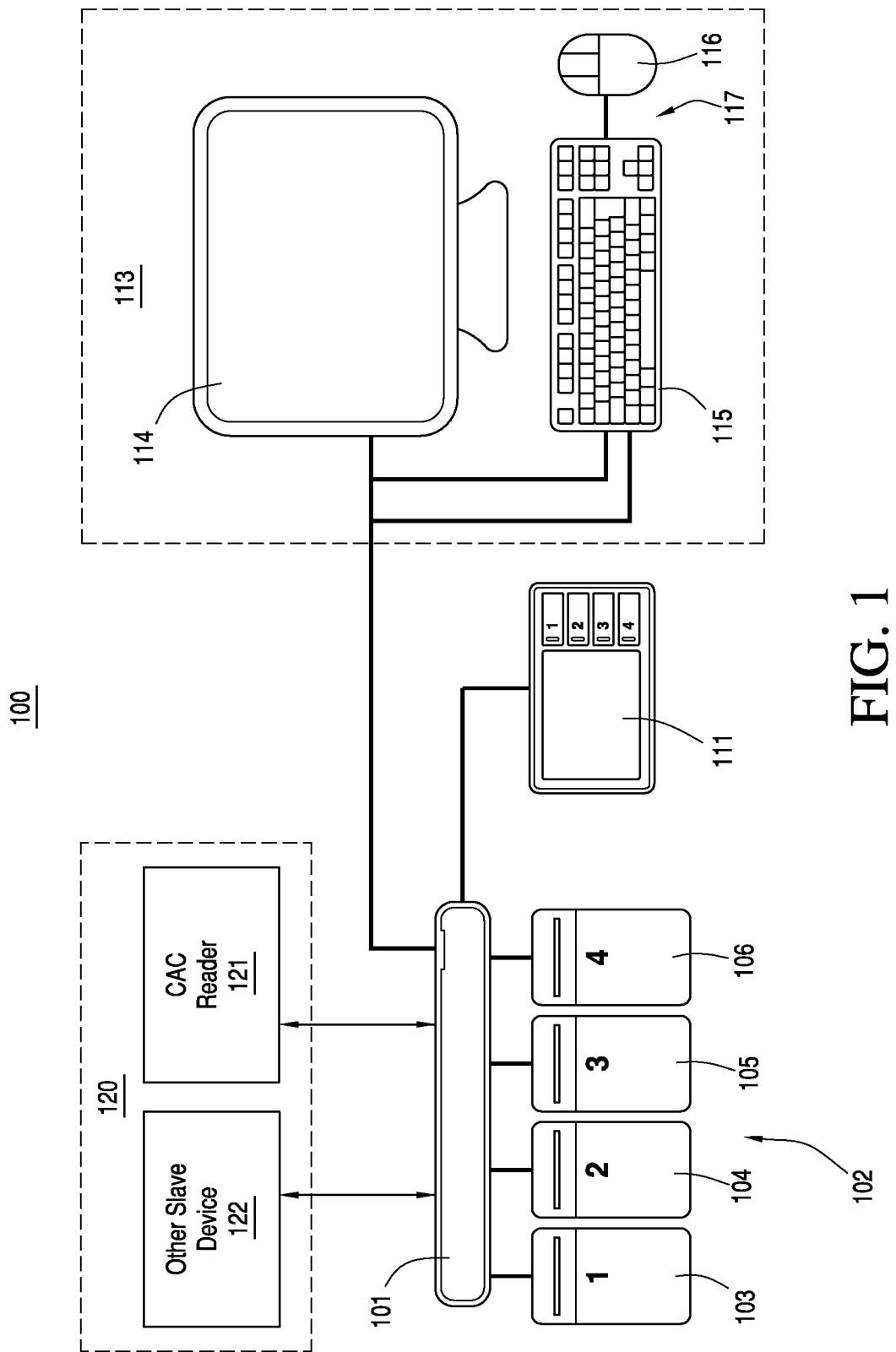
FIG. 1 illustrates a system, according to one embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together, but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiment include a system. The system comprises a keyboard-video-mouse switching device. The keyboard-video-mouse switching device is configured to communicate with one or more host computer systems, a control terminal, and a user interface. The keyboard-video-mouse switching device can comprise a virtual port through which the user interface communicates with the keyboard-video-mouse switching device and one or more physical ports through which the one or more host computer systems communicate with the keyboard-video-mouse switching device. Further, the user interface can be configured to permit selection of at least one selected host computer system of the one or more host computer systems after the user interface is paired with the keyboard-video-mouse switching device. However, the user interface can be unable to select the at least one selected host computer system of the one or more host computer systems until the user interface is paired with the keyboard-video-mouse switching device. Meanwhile, when the keyboard-video-mouse switching device is communicating with the one or more host computer systems and the control terminal and when the user interface is paired with the keyboard-video-mouse switching device, the keyboard-video-mouse switching device is configured to route host computer audio-visual data from the at least one selected host computer system of the one or more host computer systems to the control terminal.

Various embodiments include a method. The method can comprise: manufacturing a keyboard-video-mouse switching device comprising a virtual port and one or more physical ports; configuring the keyboard-video-mouse switching device to communicate with one or more host computer systems, a control terminal, and a user interface, the keyboard-video-mouse switching device being configured to communicate with the user interface through the virtual port and to communicate with the one or more host computer systems through the one or more physical ports; configuring the user interface to permit selection of at least one selected host computer system of the one or more host computer systems after the user interface is paired with the keyboard-video-mouse switching device; configuring the user interface to be unable to select the at least one selected host computer system of the one or more host computer systems until the user interface is paired with the keyboard-video-mouse switching device; and configuring the keyboard-video-mouse switching device such that when (a) the keyboard-video-mouse switching device is communicating with the one or more host computer systems and the control terminal and (b) the user interface is paired with the keyboard-video-mouse switching device, the keyboard-video-mouse switching device is configured to route host computer audio-visual data from the at least one selected host computer system of the one or more host computer systems to the control terminal.

Further embodiments include a method. The method can comprise: detecting a user interface at a virtual port of a keyboard-video-mouse switching device when the user interface is coupled with the keyboard-video-mouse switching device, the keyboard-video-mouse switching device being configured to communicate with one or more host computer systems, a control terminal, and the user interface; pairing the user interface to the keyboard-video-mouse switching device;

and receiving a selection of at least one selected host computer system of the one or more host computer systems at the keyboard-video-mouse switching device via one or more user interface inputs of the user interface when the user interface is paired with the keyboard-video-mouse switching device.

Turning to the drawings, FIG. 1 illustrates system 100, according to one embodiment. System 100 is merely exemplary and is not limited to the embodiments presented herein. System 100 can be employed in many different embodiments or examples not specifically depicted or described herein.

Figure 15:
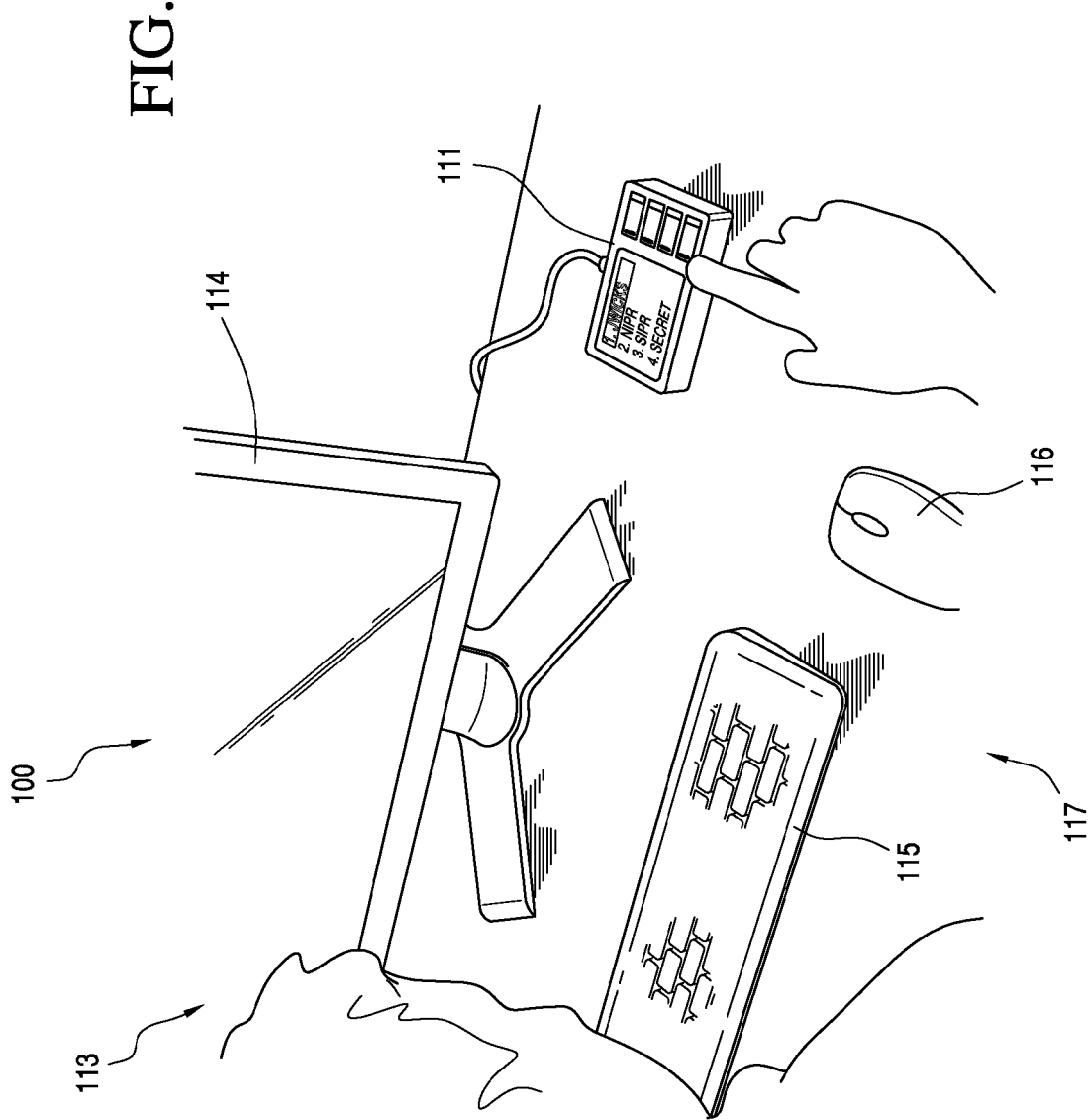
FIG. 15 illustrates the exemplary system of FIG. 1 being used by the user(s)

System 100 comprises keyboard-video-mouse (KVM) switching device 101. KVM switching device 101 is configured to route host computer audio-visual data (e.g., audio data and/or video data) from one or more host computer systems 102 to control terminal 113. For example, KVM switching device 101 can be configured to route the host computer audio-visual data from one or more presently selected host computer systems (e.g., host computer system 103) of host computer system(s) 102 to control terminal 113. Generally speaking, the presently selected host computer system(s) only comprises one host computer system of host computer system(s) 102 although the presently selected host computer system(s) could comprise multiple ones of host computer system(s) 102 in some embodiments. Accordingly, one or more users of system 100 and/or KVM switching device 101 can select from which of host computer system(s) 102 (e.g., host computer system 103) to receive the host computer audio-visual data at control terminal 113 by using user interface 111, as described in further detail below. As a result, KVM switching device 101 is configured to provide control (e.g., centralized control) of host computer system(s) 102 (e.g., to the user(s) of system 100 and/or KVM switching device 101) via user interface 111. FIG. 15 illustrates an exemplary system 100 being used by the user(s).

Figure 18:
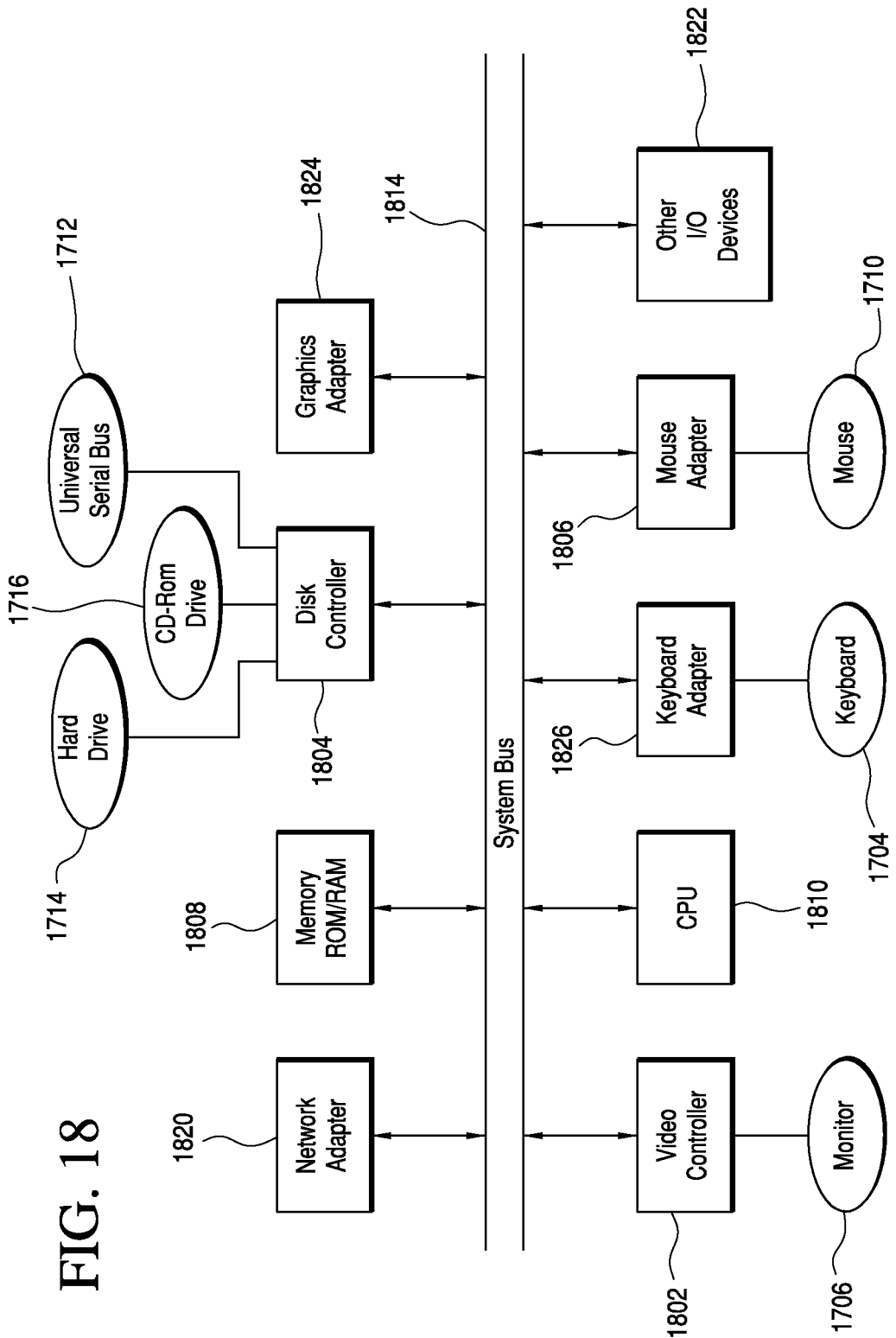
FIG. 18 illustrates a representative block diagram of an example of elements included in circuit boards inside a chassis of the computer system or virtual port of FIG. 17.

Control terminal 113 can comprise audio-visual display device 114 (e.g., an electronic visual display such as a computer monitor and/or the like), one or more peripheral input devices 117 (e.g., computer keyboard 115, computer mouse 116, and/or the like), and/or at least one speaker (not shown). Audio-visual device 114 can be similar or identical to refreshing monitor 1706 (FIGS. 17 & 18). Computer keyboard 115 can be similar or identical to keyboard 1704 (FIGS. 17 & 18). Computer mouse 116 can be similar or identical to mouse 1710 (FIGS. 17 & 18). The speaker(s) can be integrated with and/or separate from audio-visual display device 114. Audio-visual display device 114 and/or the speaker(s) can be configured to present the host computer audio-visual data to the user(s) of control terminal 113. Peripheral input device(s) 117 can be configured to permit the user(s) to provide command data (e.g., one or more user input(s)) to host computer system(s) 102 and/or KVM switching device 101 in order to communicate with and/or to operate host computer system(s) 102 and/or KVM switching device 101. Accordingly, when the user(s) are operating peripheral input device(s) 117 of control terminal 113, KVM switching device 100 can also be configured to route the command data from peripheral input device(s) 117 of control terminal 113 to host computer system(s) 102. In some embodiments, system 100 can comprise one or more of control terminal 113, one or more of audio-visual display device 114, and one or more of peripheral input device(s) 117 such as keyboard 115, mouse 116, and/or the speaker(s). The interactions of control terminal 113, audio-visual display device 114, peripheral input device(s) 117, keyboard 115, mouse 116, and/or the speaker(s), with respect to routing the audio-visual data and/or the command data, are described in further detail below with respect to FIG. 2.

In many embodiments, host computer system(s) 102 can comprise four computer system (e.g., host computer system 103, host computer system 104, host computer system 105, and/or host computer system 106). In other embodiments, host computer system(s) 102 can comprise more or less than four computer systems. Each host computer system of host computer system(s) 102 (e.g., host computer system 103, host computer system 104, host computer system 105, and/or host computer system 106) can be similar or identical to computer system 1700 (FIG. 17), as described below. In another embodiment, each host computer system of host computer system(s) 102 (e.g., host computer system 103, host computer system 104, host computer system 105, and/or host computer system 106) can be similar or identical to chassis 1702 (FIG. 17) of computer system 1700 (FIG. 17) and the circuit board(s) and/or other component(s) contained in chassis 1702 (FIG. 17), as described below. In some embodiments, system 100 can comprise two or more of host computer system(s) 102 (e.g., host computer system 103, host computer system 104, host computer system 105, and/or host computer system 106). In various embodiments, any host computer system of host computer system(s) 102 can be configured to require a common access card (CAC) (e.g., authentication and/or validation of the CAC) in order to be secured and/or operated, as described in further detail below.

System 100 and/or KVM switching device 101 can comprise one or more switching device peripheral device(s) 120 configured to communicate with KVM switching device 101. In many embodiments, switching device peripheral device(s) 120 can comprise CAC reader 121. CAC reader 121 can be configured to receive the CAC and permit the user(s) to access one or more of host computer system(s) 102 when any of those host computer systems require CAC access. In the same or different embodiments, switching device peripheral device(s) 120 can comprise any suitable other slave device 122 (e.g., a printer, an external hard drive, a modem, one or more speakers, etc.). In some embodiments, any of switching device peripheral device(s) 120 can be part of and/or can be located at control terminal 113 (e.g., for ease of access to the user(s) of system 100). In other embodiments, one or more of switching device peripheral device(s) 120 can be located remotely from terminal 113. KVM switching device 101 can permit communication between the switching device peripheral device(s) 120 and the appropriate host computer system(s) 102. In many embodiments, switching device peripheral device(s) 120 can be coupled to KVM switching device 101 via different connectors (although the connectors may be the same type of connectors) than peripheral input device(s) 117.

Further, system 100 can comprise user interface 111. As mentioned briefly above, user interface 111 can be configured to control KVM switching device 101, thereby facilitating control (e.g., central control) of host computer system(s) 102. Accordingly, KVM switching device 101 can be configured to communicate with user interface 111. In many embodiments, user interface 111 can be coupled (e.g., mechanically and/or electrically) with KVM switching device 101. Coupling user interface 111 to KVM switching device 101 can facilitate communication between user interface 111 and KVM switching device 101 and also can facilitate communication between KVM switching device 101 and host computer system(s) 102.

User interface 111 can be integrated with or separate from KVM switching device 101. Further, user interface 111 can be configured to communicate with KVM switching device 101 through wired and/or wireless communication. For example, user interface 111 can be configured to communicate with KMC switching device 101 via (a) one or more components configured to provide wired communication (e.g., one or more data buses, such as, for example, universal serial bus(es); one or more networking cables, such as, for example, coaxial cable(s), optical fiber cable(s), twisted pair cable(s); any other suitable data cable, etc.) and/or (b) one or more components configured to provide wireless communication (e.g., one or more radio transceivers, one or more infrared transceivers, etc.). Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3, IEEE 802.11, etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/Time Division Multiple Access (TDMA)), Integrated Digital Enhanced Network (iDEN), etc. The components implementing the wired and/or wireless communication can be dependent on the network topologies and/or protocols in use, and vice versa.

Accordingly, in many embodiments, when user interface 111 is separate from KVM switching device 101, user interface 111 can operate as a remote user interface. For example, user interface 111 could communicate with KVM switching device 101 using a mesh wireless communication network such as a Bluetooth™ mesh computer network connection. However, in many examples, using wired communication between user interface 111 and KVM switching device 101 can provide increased security of the host computer audio-visual data where heightened security is an issue. When user interface 111 is configured to communicate with KVM switching device 101 through a wired coupling, user interface 111 can comprise the cable and/or bus connector (e.g., the cable and/or bus connector can be integral with user interface 111). The cable and/or bus connector can be approximately 3.05 meters (10 feet) in length. In some embodiments, the cable and/or bus connector can be coupled to KVM switching device 101 via a latching connector. In many embodiments, user interface 111 is not an onscreen display (OSD) (i.e., user interface 111 is not provided (e.g., displayed) via control terminal 113 and/or audio-visual display device 114), but rather is a separate electronic device.

Operating user interface 111 remotely from KVM switching device 101 can provide various advantages to the user(s) employing system 100. For example, the user(s) of system 100 can operate user interface 111 at a location proximate to control terminal 113 (e.g., on a desktop surface supporting control terminal 113) while the remaining elements of system 100 (e.g., KVM switching device 101, host computer system(s) 102, etc.) can be located elsewhere (e.g., under the desk having the desktop surface and/or in another room, building, etc.), thereby reducing the spatial volume of system 100 located proximate to control terminal 113 (e.g., saving space on the desktop surface) and/or the user(s). In the same example, user interface 111 could be located near peripheral input device(s) 117 (e.g., mouse 116) of control terminal 113. Meanwhile, operating user interface 111 also can provide ease of switching between host computer system(s) 102 by bringing user interface 111 to the user(s) as opposed to requiring the user(s) to go to KVM switching device 101, which may be inconveniently located away from control terminal 113 and/or the user(s) (e.g., under the desktop surface supporting control terminal 113 mentioned above), thereby minimizing switching errors (e.g., by switching to an incorrect host computer system) and/or providing clear, unambiguous indication of which host computer system is presently selected, as explained in greater detail below.

Operating user interface 111 remotely from KVM switching device 101 can also provide various advantages to technicians tasked with installing and maintaining system 100. For example, operating user interface 111 remotely from KVM switching device 101 can permit quicker deployment and/or easier replacement of system 100, KVM switching device 101, and/or user interface 111. Likewise, operating user interface 111 remotely from KVM switching device 101 can further improve reliability and durability of system 100, KVM switching device 101, and/or user interface 111, reducing the need for technical support of system 100, KVM switching device 101, and/or user interface 111.

User interface 111 can comprise one or more user interface inputs (e.g., capacitive buttons, resistive buttons, and/or mechanical buttons) permitting the user(s) of system 100 to select from which host computer system(s) of host computer system(s) 102 to route the host computer audio-visual data to control terminal 113, where each user interface input is associated with one physical port of KVM switching device 101, as described in further detail below. Meanwhile, user interface 111 can be configured (e.g., by the user(s), as described below) to associate a number, name, symbol, and/or a color with each respective host computer system of host computer system(s) 102 by assigning that number, name, symbol, and/or color that is associated with the respective host computer system of host computer system(s) 102 to the user interface input associated with that physical port to which the respective host computer system is coupled. The user(s) of system 100 can customize the association of a number, name, symbol, and/or color established by user interface 111 during configuration of user interface 111, as described below. In some embodiments, the number associated with each user interface input is static and not subject to customization but the name, symbol, and/or color remain subject to customization. In various embodiments, the user interface input(s) can be recessed into the front surface of user interface 111 to prevent accidental activation by the user(s) of system 100.

In some embodiments, user interface 111 can comprise an electronic display (e.g., a liquid crystal display such as a monochrome liquid crystal display, an organic light emitting diode display, etc.). The electronic display can comprise a touch screen electronic display (e.g., a capacitive or a resistive touch screen electronic display). The electronic display can comprise the user interface input(s), and/or the user interface input(s) can be separate from the electronic display, as shown in FIG. 1. In the same or different embodiments, the user interface input(s) can comprise one or more light emitting diodes (e.g., red-green-blue (RGB) light emitting diodes) configured to emit one or more colors (e.g., whichever color is selected for association with that particular user interface input and/or that host computer system coupled to the physical port with which that particular user interface input is associated). In other embodiments, when the user interface input(s) are implemented as mechanical buttons as opposed to capacitive and/or resistive buttons operating as part of an electronic display of user interface 111, the user interface input(s) can comprise the light emitting diodes (i.e., because the color coding could otherwise be implemented at the electronic display as opposed to the separate light emitting diodes).

For example, user interface 111 can comprise an organic light emitting diode (OLED) capacitive electronic display (e.g., an OLED touch screen display). In some embodiments, the user interface input(s) can comprise capacitive buttons displayed on the OLED capacitive display. Each user interface input can display the name, symbol, and/or color associated with the respective host computer system coupled to the physical port with which that user interface input is associated.

In another example, user interface 111 can comprise a monochrome liquid crystal display and the user interface input(s) can comprise one or more mechanical buttons positioned adjacent to the liquid crystal display. Accordingly, each user interface input can comprise one or more light emitting diodes configured to emit one or more colors, as determined upon configuration of user interface 111 by the user(s). A number can be pre-assigned to each user interface input, and the liquid crystal display can be configured to display a name associated with each of the user interface input(s) (e.g., at least for those user interface input(s) that are coupled to a host computer system of host computer system(s) 102) next to that respective user interface input of the user interface input(s).

Figure 23:
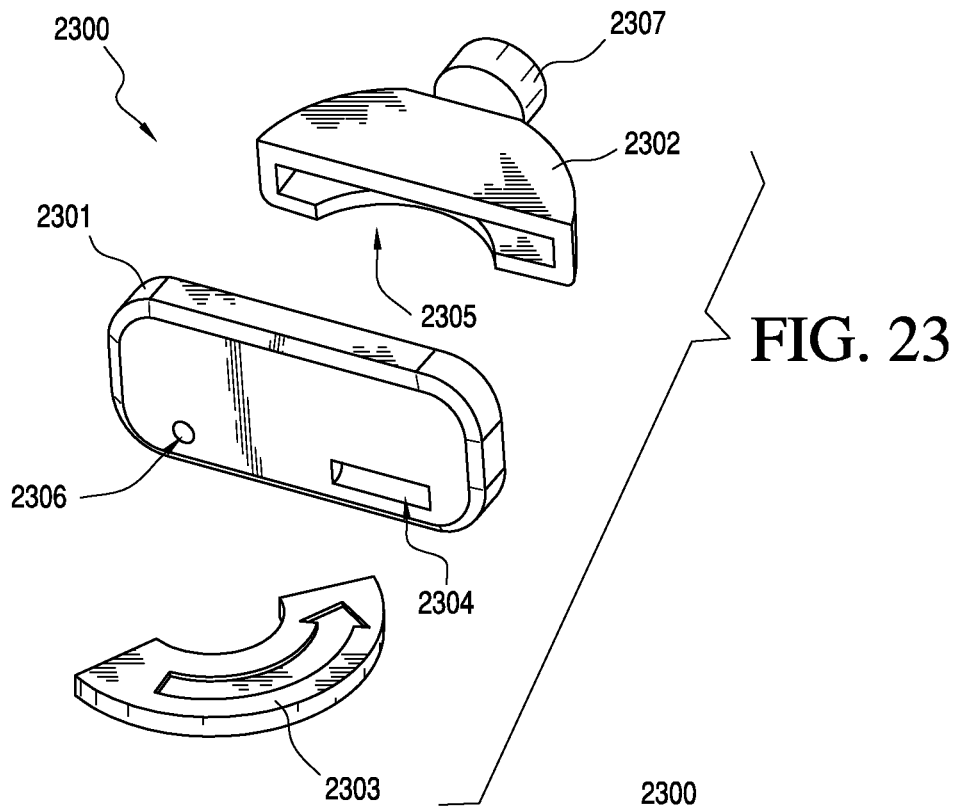
FIG. 23 illustrates an exploded view of an exemplary a user input implemented as a mechanical button, according to an embodiment.

Turning ahead in the drawings, FIG. 23 illustrates an exploded view of an exemplary user input 2300 implemented as a mechanical button, according to an embodiment. User input 2300 can be similar or identical to one of the user input(s) described above with respect to system 100 (FIG. 1). Accordingly, multiple of user input 2300, as described below, can be implemented to provide the user input(s) of system 100 (FIG. 1).

User input 2300 can comprise face portion 2301 and connector portion 2302. Face portion 2301 can comprise opening 2304 and can be configured to couple with connector portion 2302. When face portion 2301 is coupled with connector portion 2302, user input 2300 can comprise recess 2305. In some embodiments, face portion 2301 can also comprise opening 2306. Further, user input 2300 can comprise color chip 2303. Meanwhile, connector portion 2302 can comprise coupling mechanism 2307.

Connector portion 2302 can be coupled to a user interface via coupling mechanism 2307. For example, the user interface can be similar or identical to user interface 111. Accordingly, user input 2300 can be coupled to the user interface via connector portion 2302. An electronic display of the user interface can be positioned proximate to user input 2300 so as to display a relevant number, name, symbol, and/or color associated with user input 2300 next to user input 2300. The electronic display can be similar or identical to the electronic display of user interface 111.

Color chip 2303 can be coupled with user input 2300, thereby permitting association of a color of color chip 2303 with user input 2300, such as, for example, to permit distinction of user input 2300 from another user input. Further, color chip 2303 can be interchangeable with one or more other color chips similar or identical to color chip 2303 so that user input 2300 can be customized by the user(s) of user input 2300. For example, color chip 2303 and the other color chips each can comprise different colors configured to permit differentiation of each of color chip 2303 and the other color chips from each other. User input 2300 and/or recess 2305 can be configured to receive color chip 2303, and recess 2305 can be shaped to match a shape of color chip 2303. For example, color chip 2303 and recess 2305 can be approximately semicircular in shape although other suitable shapes can also be used. Accordingly, recess 2305 can be configured to receive color chip 2303 via opening 2304. That is, color chip 2303 can be inserted into recess 2303 through opening 2304 and where applicable, around to opening 2306 on an opposite side of recess 2305 from opening 2304. Color chip 2303 can be removable from user input 2300 and/or recess 2305, such as, for example, when face portion 2301 comprises opening 2306. For example, by application of force (e.g., via a pin or a similarly pointed object, such as, for example, an unfolded paper clip) to color chip 2303 through opening 2306, color chip 2303 can be partially pressed out of recess 2305 via opening 2304 and extracted from recess 2305 via opening 2304. Accordingly, color chip 2303 can be replaced with another color chip, as desired. In some embodiments, one or more of the color chips (e.g., color chip 2303) can comprise the same color, as desirable. Color chip 2303 can comprise a marker (e.g., an arrow) to indicate how to insert color chip 2303 into opening 2304 and/or recess 2305.

Figure 24:
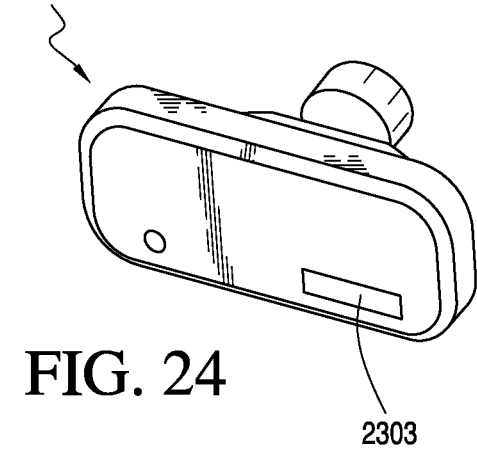
FIG. 24 shows a front, right, top isometric view of the user input of the embodiment of FIG. 23.
Figure 25:
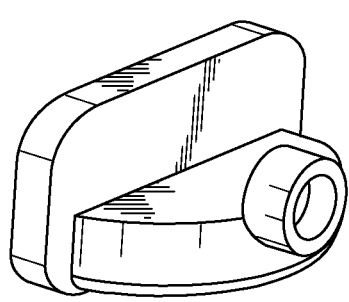
FIG. 25 shows a rear, right, top isometric view of the user input of the embodiment of FIG. 23.
Figure 26:
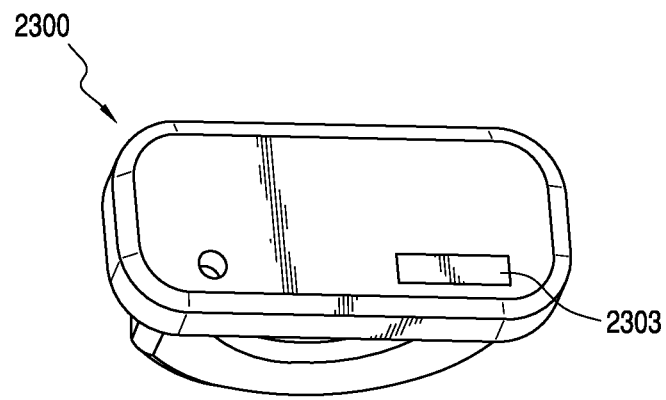
FIG. 26 shows a front, bottom isometric view of the user input of the embodiment of FIG. 23.
Figure 27:
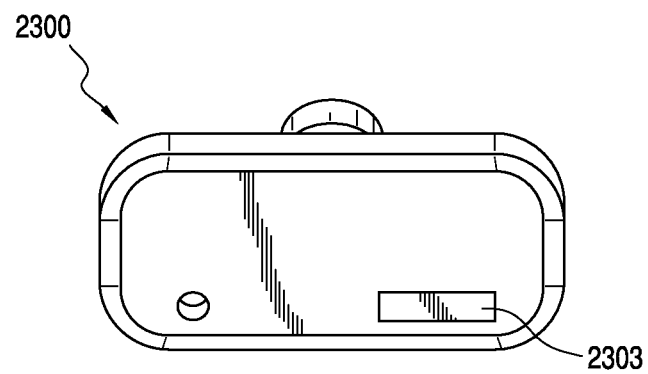
FIG. 27 shows a front, top isometric view of the user input of the embodiment of FIG. 23.
Figure 28:
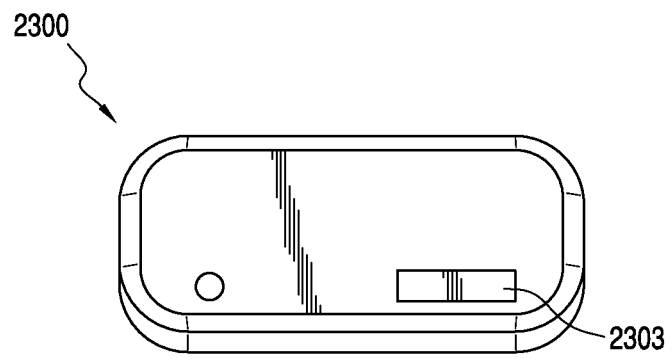
FIG. 28 shows a front view of the user input of the embodiment of FIG. 23.

FIGS. 24-28 illustrate user input 2300 from various different views when user input has received color chip 2303, according to the embodiment of FIG. 23. For example, FIG. 24 shows a front, right, top isometric view of user input 2300. FIG. 25, shows a rear, right, top isometric view of user input 2300. FIG. 26, shows a front, bottom isometric view of user input 2300. FIG. 27 shows a front, top isometric view of user input 2300. Finally, FIG. 28, shows a front view of user input 2300.

Returning now to FIG. 1, by implementing the user interface input(s) as part of an electronic display of user interface 111, user interface 111 can be smaller and therefore occupy less space. This approach can also remove redundancy where a number, name, symbol, and/or color of the port might otherwise be displayed both on the electronic display and separate user interface input(s). Likewise, this approach can offer a singular point of feedback as well as higher visibility than alternative approaches for implementing the user interface input(s) as a result of higher contrast and/or resolution provided by the electronic display.

In an operational example of user interface 111, illumination and/or color of the number associated with each of the user interface input(s) can indicate whether or not there is a host computer system of host computer system(s) 102 coupled to the physical port with which that user interface input is associated (i.e., whether or not the user interface input and/or the related physical port are presently active) and/or whether or not the host computer coupled to the physical port with which each of the respective user interface input(s) is associated is presently selected for use by the user(s). For example, the number of any user interface input that is presently active, but not presently selected, can be illuminated and/or colored to appear light grey whereas the number of inactive user inputs can appear dark grey. Meanwhile, the number of any presently selected and active user interface input (i.e., host computer system) can be illuminated and/or colored white. Further, the user interface input(s) can indicate whether or not CAC access is required to login to the host computer system related to that particular user interface input, such as, for example, by displaying a symbol (e.g., an icon of a card) at each of the user interface input(s) indicative of whether or not CAC access is required to login to the host computer system related to that particular user interface input.

Figure 14:
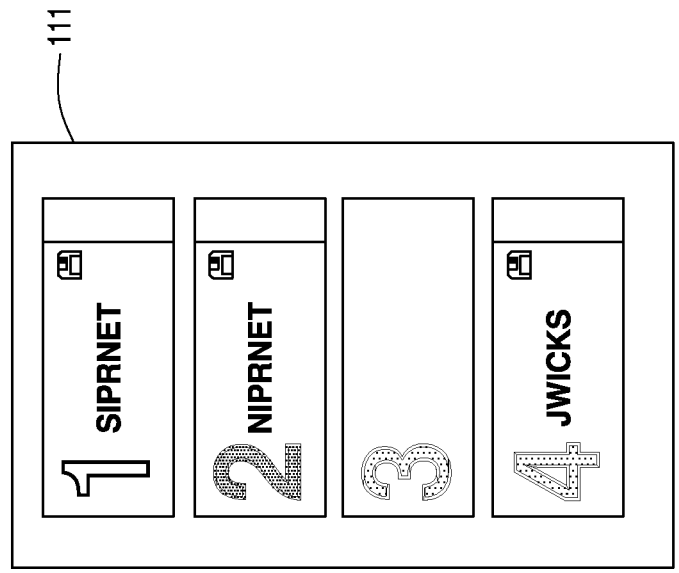
FIG. 14 illustrates an exemplary user interface audio-visual data and/or exemplary user interface input(s) of the user interface, according to the embodiment of FIG. 1.

User interface 111 can comprise a housing (e.g., a plastic housing). For increased security, the housing can be sealed with tamper-evident labels to indicate if the housing has been compromised. FIG. 14 illustrates an exemplary user interface 111 (FIG. 1) and/or exemplary user interface input(s) of user interface 111 (FIG. 1).

Figure 2:
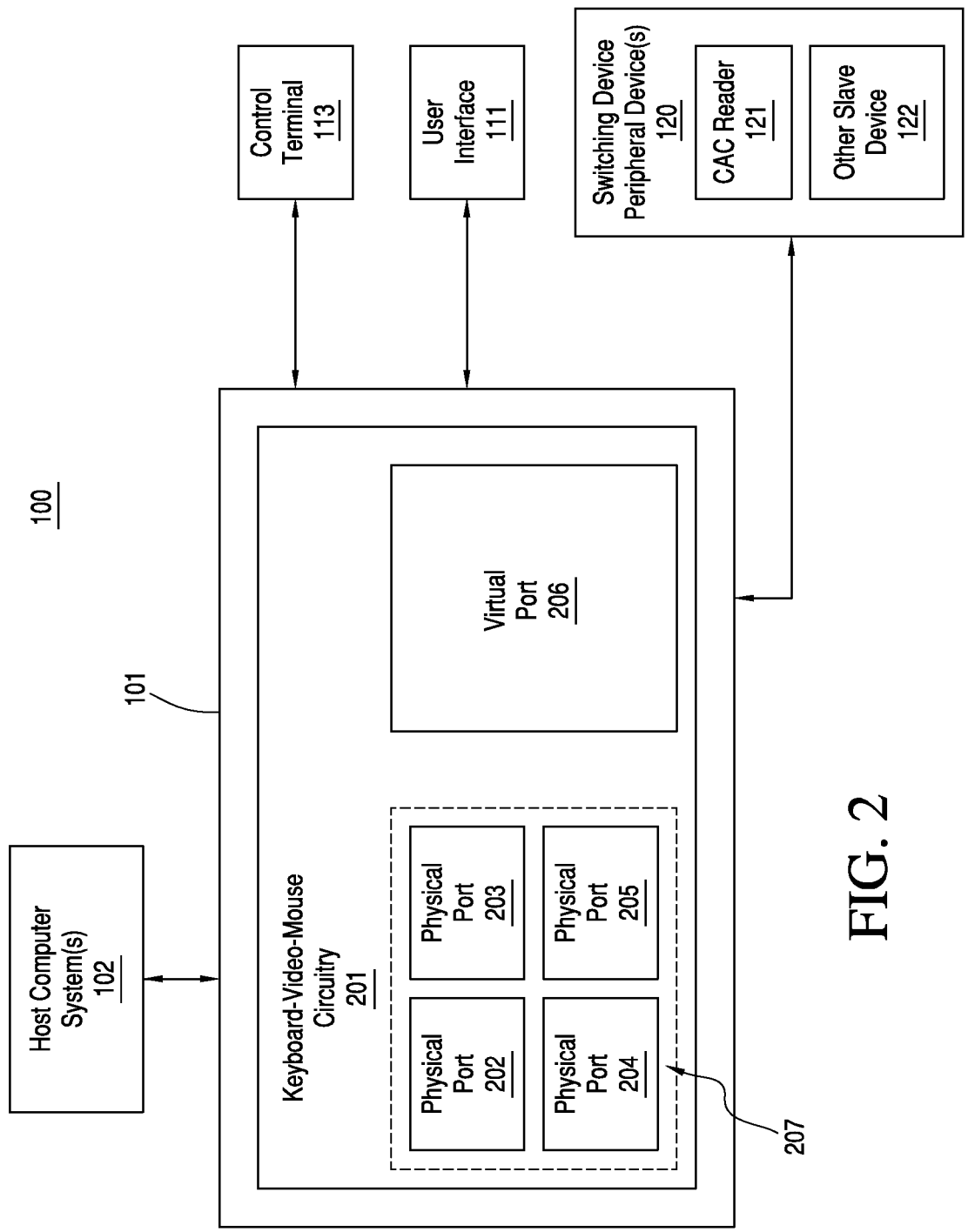
FIG. 2 is a block diagram illustrating the embodiment of the system of FIG. 1.

Meanwhile, user interface 111 can also be configured to be paired with (e.g., authenticated by) KVM switching device 101. In various embodiments, only one user interface 111 can be paired with KVM switching device 101 at any given time. In many embodiments, user interface 111 can be configured not to communicate with KVM switching device 101, or vice versa, until user interface 111 is paired with KVM switching device 101. In the same or different embodiments, KVM switching device 101 can be configured such that user interface 111 cannot communicate with and/or control KVM switching device 101 until the user interface 111 has been configured by the user(s). FIG. 2 is a block diagram illustrating system 100, according to the embodiment of FIG. 1. FIG. 2 helps to illustrate system 100, KVM switching device 101, and/or user interface 111 in operation generally and also helps to illustrate pairing user interface 111 with KVM switching device 101 as well as configuring user interface 111 to permit user interface 111 to control KVM switching device 101.

Referring now to FIG. 2, KVM switching device 101 (FIG. 1) comprises KVM circuitry 201. KVM circuitry 201 can be configured to permit KVM switching device 101 (FIG. 1) to route the host computer audio-visual data from host computer system(s) 102 (FIG. 1) to control terminal 113 (FIG. 1). KVM circuitry 201 can comprise one or more physical port(s) 207 (e.g., physical port 202, physical port 203, physical port 204, and/or physical port 205). Each physical port of physical port(s) 207 can be configured to couple with one host computer system of host computer system(s) 102 (FIG. 1). Each physical port of physical port(s) 207 can comprise at least one audio-visual input connector and at least one peripheral input device connector. For example, the audio-visual input connector(s) can comprise any suitable audio-visual device connector(s) (e.g., a universal serial bus (USB) connector, a high-definition multimedia interface (HDMI) connector, a digital visual interface (DVI) connector, a display port (DP) connector, a video graphics array (VGA) connector, composite cable connectors, an S-Video connector, an optical audio connector, Radio Corporation of America (RCA) connectors, a tip-ring-sleeve (TRS) connector such as a 3.5 millimeter TRS connector, etc.) and can be configured to receive a corresponding data cable and/or bus configured to couple to any appropriate corresponding audio-visual input connector(s) of the corresponding host computer system of host computer system(s) 102 (FIG. 1). Further, the peripheral input device connector(s) can comprise any suitable peripheral input device connectors (e.g., a USB connector, a keyboard/mouse connector, etc.) and can be configured to receive a corresponding data cable and/or bus configured to couple to any appropriate corresponding peripheral input device connector(s) of the corresponding host computer system of host computer system(s) 102 (FIG. 1). Meanwhile, KVM circuitry 201 can also comprise separate audio-visual input connector(s) and peripheral input device connector(s) configured to couple control terminal 113 (FIG. 1) (e.g., audio-visual display device 114 (FIG. 1), the speaker(s) of control terminal 113 (FIG. 1), peripheral input device(s) 117 (FIG. 1), computer keyboard 115 (FIG. 1), computer mouse 116 (FIG. 1), etc.) to KVM switching device 101 (FIG. 1). Accordingly, KVM circuitry 201 can comprise any suitable electrical networks configured to route host computer audio-visual data from any appropriate host computer system(s) (e.g., the presently selected host computer system(s)) of host computer system(s) 102 (FIG. 1)) through the corresponding physical port of physical port(s) 107 (FIG. 1) to control terminal 113 (FIG. 1) via the corresponding data cable(s) and/or bus(es) and data cable and/or bus connector(s), as appropriate. Likewise, KVM circuitry 102 (FIG. 1) can comprise any suitable electrical networks configured to route command data from control terminal 113 (FIG. 1) to the appropriate host computer system(s) (e.g., the presently selected host computer system(s)) of host computer system(s) 102 (FIG. 1)) and/or virtual port 206, as described below, via the corresponding data cable(s) and/or bus(es) and data cable and/or bus connector(s), as appropriate. Further, KVM circuitry 201 and/or its electrical networks can comprise any suitable electrical switches for implementing the KVM functionality of KVM switching device 101 (FIG. 1), as is well known to those having ordinary skill in the art such that it will not receive a detailed description herein. Further still, KVM circuitry 201 can comprise any suitable electrical networks configured to permit host computer(s) 102 (FIG. 1) and/or control terminal 113 (FIG. 1) to communicate with switching device peripheral device(s) 120 (FIG. 1), as applicable. Although communication between host computer system(s) 102 (FIG. 1), switching device peripheral device(s) 120 (FIG. 1), control terminal 113 (FIG. 1), and KVM switching device 101 (FIG. 1), is generally described here with respect to wired communication, wireless communication similar to that described above with respect to the communication between KVM switching device 101 (FIG. 1) and user interface 111 (FIG. 1) could alternatively and/or additionally be implemented here.

KVM switching device 101 (FIG. 1) also can comprise virtual port 206. In some embodiments, virtual port 206, KVM system 100 (FIG. 1), and/or KVM switching device 101 (FIG. 1) can comprise a virtual port computer system. In the same or different embodiments, virtual port 206 can be configured to communicate with the virtual port computer system. The virtual port computer system can be similar or identical to computer system 1700 (FIG. 17), as described below. In another embodiment, the virtual port computer system can be similar or identical to chassis 1702 (FIG. 17) of computer system 1700 (FIG. 17) and the circuit board(s) and/or other component(s) contained in chassis 1702 (FIG. 17), as described below. In many respects, virtual port 206 can be similar to any physical port of physical port(s) 107 but for that virtual port 206 and/or the virtual port computer system can be part of (e.g., internal to and/or integral with) KVM switching device 101 (FIG. 1).

In many embodiments, one or more of the audio-visual input connector(s) and/or peripheral input device connector(s) of virtual port 206 and/or one or more of physical port(s) 207 can be implemented as electrical networks of KVM circuitry 201 (i.e., the audio-visual input connector(s) and/or peripheral input device connector(s) would not be externally accessible to the user(s)). Still, in many embodiments, virtual port 206 comprises another physical port similar or identical to physical port(s) 107 (FIG. 1) and can be physically located at the exterior of KVM switching device 101 (FIG. 1) (i.e., making virtual port 206 externally accessible to the user(s)). Regardless of the manner of implementation, virtual port 206 and/or the virtual port computer system (a) can be configured to route switching device audio-visual data from virtual port 206 and/or the visual port computer system to control terminal 113 and/or (b) can be configured to receive command data from control terminal 113 (FIG. 1) (e.g., from peripheral input device(s) 117 (FIG. 1)) through any of the various data cable(s) and/or bus(es) and data cable and/or bus connector(s) coupling KVM switching device 101 (FIG. 1) and control terminal 113 (FIG. 1), as appropriate. Still, in many embodiments, the virtual port computer system may not have the level of sophistication and/or complexity of host computer system(s) 102 (FIG. 1). For example, the virtual port computer system may only have those processing capabilities and/or memory storage capabilities as are reasonably necessary to pair user interface 111 (FIG. 1) with KVM switching device 101 (FIG. 1) and/or to configure KVM switching device 101 (FIG. 1), as is described in further detail below. In these examples, the virtual port computer system could simply be implemented as a microcontroller comprising flash memory, or the like. Reducing the sophistication and/or complexity of the virtual computer system can reduce the size and/or cost of implementing system 100 (FIG. 1). Nonetheless, in other embodiments, the virtual port computer system may need additional sophistication and/or complexity to operate as desired.

Virtual port 206, KVM switching device 101 (FIG. 1), and/or the virtual computer system can comprise one or more memory storage modules (e.g., the storage modules of computer system 1700 (FIG. 17) and/or flash memory, as described above). The memory storage module(s) can be configured to store a code indicating the pairing of user interface 111 (FIG. 1) with KVM switching device 101 (FIG. 1), an indicator (e.g. a flag) of whether user interface 111 (FIG. 1) is presently configured, and/or configuration settings (e.g., numbers, names, symbols, and/or colors associated with the user interface input(s), the physical port(s) of the user interface, and/or the host computer system(s) as described above with respect to system 100 (FIG. 1)).

Figure 31:
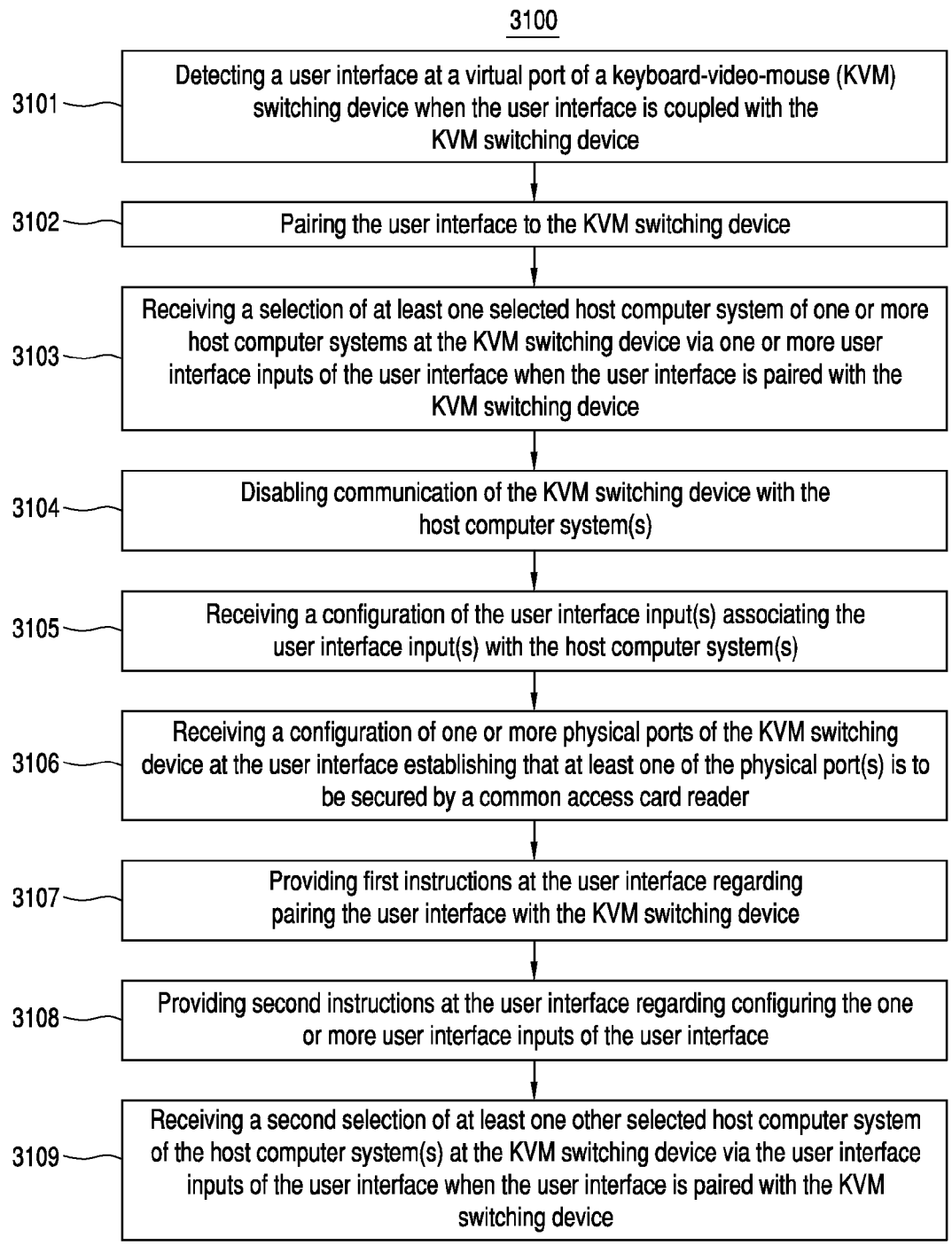
FIG. 31 illustrates a flow chart for an embodiment of a method.

Skipping ahead now in the drawings, FIG. 17 illustrates an exemplary embodiment of computer system 1700 and chassis 1702 (and its internal components) that can be suitable for implementing an embodiment of host computer system(s) 102 (FIGS. 1 & 2), the virtual port computer system, and/or a user interface computer system and/or another part of system 100 (FIGS. 1 & 2) as well as methods 1600 (FIG. 16) and 3100 (FIG. 31) and/or any of the various procedures, processes, and/or activities of methods 1600 (FIG. 16) and/or 3100 (FIG. 31). One or more parts of computer system 1700 (e.g., refreshing monitor 1706, keyboard 1704, and/or mouse 1710, etc.) may also be appropriate for implementing control terminal 113 (FIG. 1). Computer system 1700 includes chassis 1702 containing one or more circuit boards (not shown), Universal Serial Bus (USB) 1712, Compact Disc Read-Only Memory (CD-ROM) and/or Digital Video Disc (DVD) drive 1716, and hard drive 1714. A representative block diagram of the elements included on the circuit boards inside chassis 1702 is shown in FIG. 17. Central processing unit (CPU) 1810 in FIG. 18 is coupled to system bus 1814 in FIG. 18. In various embodiments, the architecture of CPU 1810 can be compliant with any of a variety of commercially distributed architecture families.

System bus 1814 also is coupled to memory 1808, where memory 1808 includes both read only memory (ROM) and random access memory (RAM). Non-volatile portions of memory 1808 or the ROM can be encoded with a boot code sequence suitable for restoring computer system 1700 (FIG. 17) to a functional state after a system reset. In addition, memory 1808 can include microcode such as a Basic Input-Output System (BIOS). In some examples, the one or more storage modules of the various embodiments disclosed herein can include memory 1808, USB 1712 (FIGS. 17-18), hard drive 1714 (FIGS. 17-18), and/or CD-ROM or DVD drive 1716 (FIGS. 17-18). In the same or different examples, the one or more storage modules of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Examples of common operating systems can include Microsoft® Windows, Mac® operating system (OS), UNIX® OS, and Linux® OS. Common operating systems for a mobile electronic device include the iPhone® operating system by Apple Inc. of Cupertino, Calif., the Blackberry® operating system by Research In Motion (RIM) of Waterloo, Ontario, Canada, the Palm® operating system by Palm, Inc. of Sunnyvale, Calif., the Android operating system developed by the Open Handset Alliance, the Windows Mobile operating system by Microsoft Corp. of Redmond, Wash., or the Symbian operating system by Nokia Corp. of Espoo, Finland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions.

In the depicted embodiment of FIG. 18, various I/O devices such as disk controller 1804, graphics adapter 1824, video controller 1802, keyboard adapter 1826, mouse adapter 1806, network adapter 1820, and other I/O devices 1822 can be coupled to system bus 1814. Keyboard adapter 1826 and mouse adapter 1806 are coupled to keyboard 1704 (FIGS. 17-18) and mouse 1710 (FIGS. 17-18), respectively, of computer system 1700 (FIG. 17). While graphics adapter 1824 and video controller 1802 are indicated as distinct units in FIG. 18, video controller 1802 can be integrated into graphics adapter 1824, or vice versa in other embodiments. Video controller 1802 is suitable for refreshing monitor 1706 (FIGS. 17-18) to display images on a screen 1708 (FIG. 17) of computer system 1700 (FIG. 17). Disk controller 1804 can control hard drive 1714 (FIGS. 17-18), USB 1712 (FIGS. 17-18), and CD-ROM drive 1716 (FIGS. 17-18). In other embodiments, distinct units can be used to control each of these devices separately.

In some embodiments, network adapter 1820 can be part of a WNIC (wireless network interface controller) card (not shown) plugged or coupled to an expansion port (not shown) in computer system 1700. In other embodiments, the WNIC card can be a wireless network card built into computer system 1700. A wireless network adapter can be built into computer system 1700 by having wireless Ethernet capabilities integrated into the motherboard chipset (not shown), or implemented via a dedicated wireless Ethernet chip (not shown), connected through the PCI (peripheral component interconnector) or a PCI express bus. In other embodiments, network adapter 1820 can be a wired network adapter.

Although many other components of computer system 1700 (FIG. 17) are not shown, such components and their interconnection are well known to those of ordinary skill in the art. Accordingly, further details concerning the construction and composition of computer system 1700 and the circuit boards inside chassis 1702 (FIG. 17) are not discussed herein.

When computer system 1700 in FIG. 17 is running, program instructions stored on a USB-equipped electronic device connected to USB 1712, on a CD-ROM or DVD in CD-ROM and/or DVD drive 1716, on hard drive 1714, or in memory 1808 (FIG. 18) are executed by CPU 1810 (FIG. 18). A portion of the program instructions, stored on these devices, can be suitable for carrying out at least part of system 100 (FIGS. 1 & 2), method 1600 (FIG. 16), and/or method 3100 (FIG. 31).

Although computer system 1700 is illustrated as a desktop computer in FIG. 17, there can be examples where computer system 1700 may take a different form factor (e.g., a mobile electronic device, a laptop computer) while still having functional elements similar to those described for computer system 1700. In some embodiments, computer system 1700 may comprise a single computer, a single server, or a cluster or collection of computers or servers, or a cloud of computers or servers. Typically, a cluster or collection of servers can be used when the demand on computer system 1700 exceeds the reasonable capability of a single server or computer.

Returning again to FIG. 2, virtual port 206 and/or the virtual port computer system can be configured to permit the user(s) to pair user interface 111 (FIG. 1) with KVM switching device 101 (FIG. 1) and to configure the manner in which user interface 111 (FIG. 1) controls KVM switching device 101 (FIG. 1) and the respective host computer system(s) 102 (FIG. 1), as a result.

Figure 3:
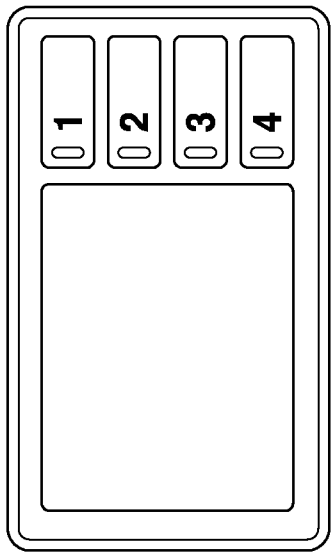
FIG. 3 illustrates exemplary switching device audio-visual data instructing one or more user(s) to couple a user interface to a KVM switching device, according to the embodiment of FIG. 1.

To begin with, upon turning on KVM switching device 101 (FIG. 1), KVM switching device 101 (FIG. 1) can be configured to detect whether user interface 111 (FIG. 1) is presently coupled with KVM switching device 101 (FIG. 1). If KVM switching device 101 (FIG. 1) detects user interface 111 (FIG. 1) is not presently coupled with it, KVM switching device 101 (FIG. 1) can be configured to switch to virtual port 206 and virtual port 206 can be configured to route switching device audio-visual data from virtual port 206 (e.g., from the virtual port computer system) to control terminal 113 (FIG. 1). The switching device audio-visual data can instruct the user(s) to couple user interface 111 (FIG. 1) to KVM switching device 101 (FIG. 1) and can be presented by control terminal 113 (FIG. 1) (e.g., via audio-visual display device 114 and/or the speaker(s) of control terminal 113). FIG. 3 illustrates exemplary switching device audio-visual data instructing the user(s) to couple user interface 111 (FIG. 1) to KVM switching device 101 (FIG. 1). As an example, this switching device audio-visual data can be presented to the user(s) on audio-visual display device 114. When KVM switching device 101 (FIG. 1) detects user interface 111 (FIG. 1), KVM switching device 101 (FIG. 1) can proceed to pairing with user interface 111 (FIG. 1).

Figure 4:
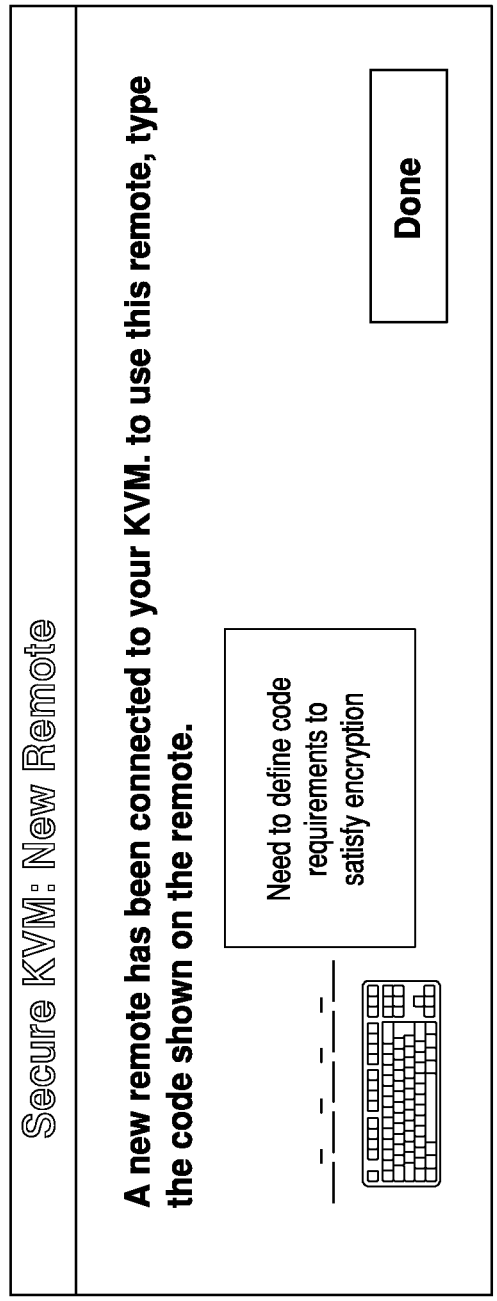
FIG. 4 illustrates exemplary switching device audio-visual data instructing the user(s) to provide a code presented at the user interface, according to the embodiment of FIG. 1.
Figure 5:
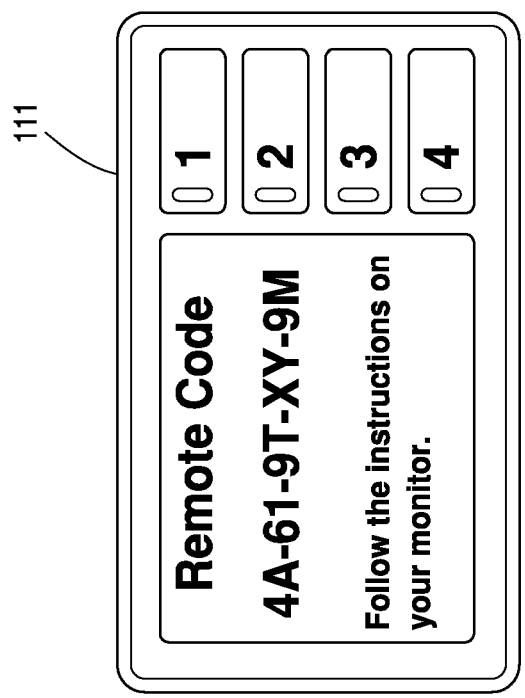
FIG. 5 illustrates exemplary user interface audio-visual data comprising the code presented at the user interface, according to the embodiment of FIG. 1.

After coupling with user interface 111 (FIG. 1), KVM switching device 101 (FIG. 1) can be configured to detect whether user interface 111 (FIG. 1) is presently paired with KVM switching device 101 (FIG. 1). If KVM switching device 101 (FIG. 1) detects user interface 111 (FIG. 1) is not presently paired with it, KVM switching device 101 (FIG. 1) can be configured to switch to virtual port 206, and virtual port 206 can be configured to route switching device audio-visual data from virtual port 206 (e.g., from the virtual port computer system) to control terminal 113 (FIG. 1). The switching device audio-visual data can instruct the user(s) to enter a code presented at user interface 111 (FIG. 1) to pair KVM switching device 101 (FIG. 1) and user interface 111 (FIG. 1). This switching device audio-visual data can be presented by control terminal 113 (FIG. 1). FIG. 4 illustrates exemplary switching device audio-visual data presented or displayed at audio-visual device 114 and instructing the user(s) to provide the code presented at user interface 111 (FIG. 1). Meanwhile, user interface 111 (FIG. 1) can present user interface audio-visual data at user interface 111 (FIG. 1) where the user interface audio-visual data can comprise the code for pairing user interface 111 (FIG. 1) with KVM switching device 101 (FIG. 1). FIG. 5 illustrates exemplary user interface audio-visual data comprising the code presented at user interface 111 (FIG. 1).

Figure 6:
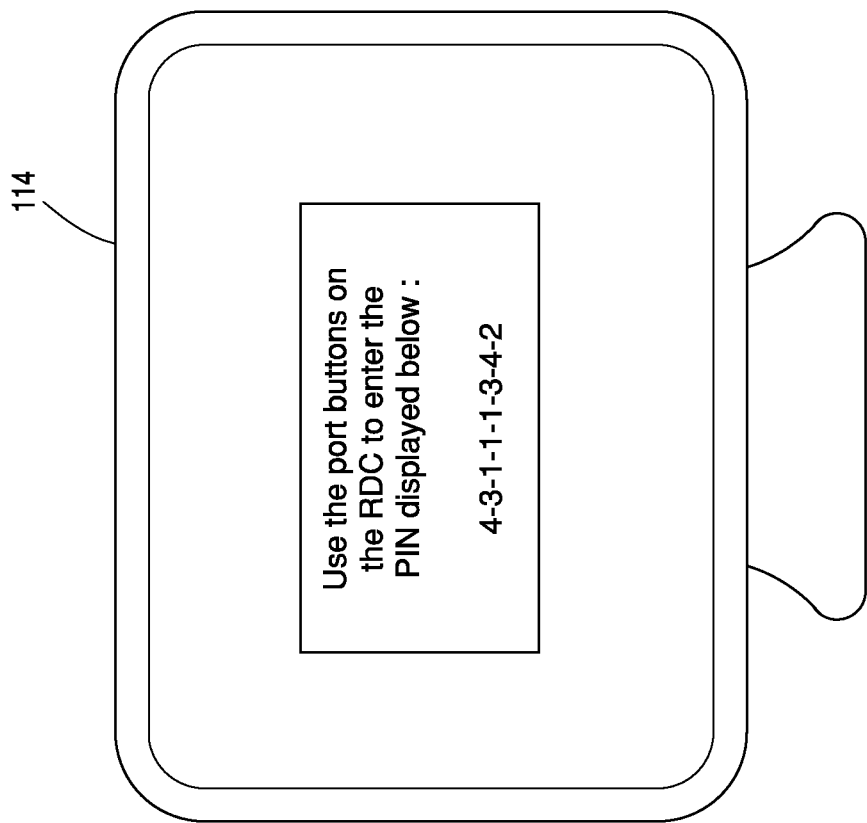
FIG. 6 illustrates the user(s) providing the code to a control terminal via one or more user interface input(s), according to the embodiment of FIG. 1.

The user(s) can provide the code (e.g., as command data) to control terminal 113 (FIG. 1) via peripheral input device(s) 117 (FIG. 1) and/or the user interface input(s) of user interface 111 (FIG. 1). For example, the user(s) can enter the code via computer keyboard 115 (FIG. 1) and/or mouse 116 (FIG. 1), as would be the case where the code resembles the code in FIG. 5, or can enter the code as some particular provided sequence of the user interface input(s) of user interface 111 (FIG. 1). FIG. 6 illustrates the user(s) providing the code to control terminal 113 (FIG. 1) via the user interface input(s).

Figure 7:
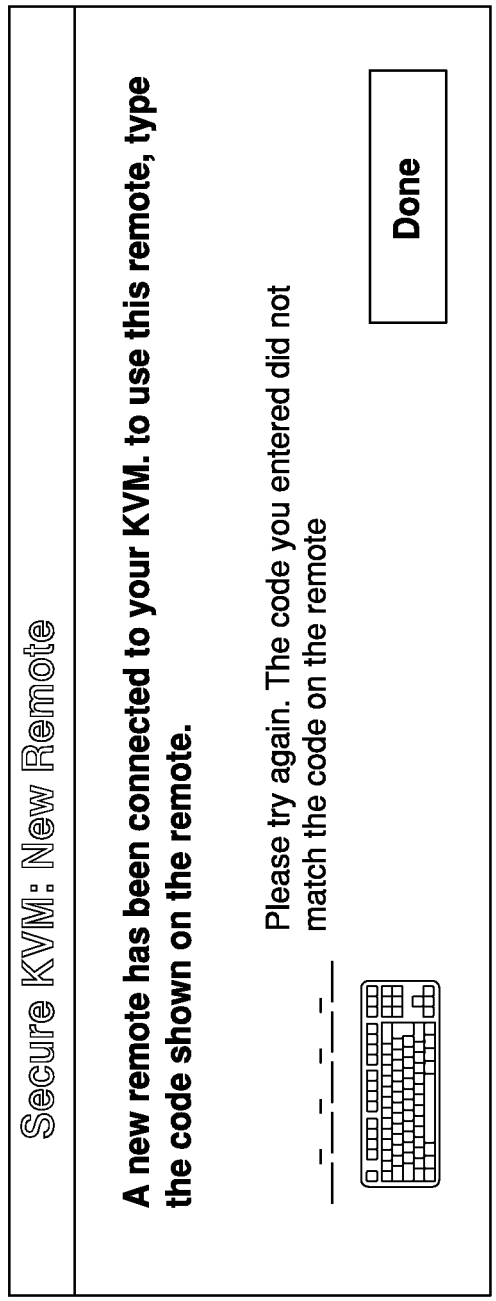
FIG. 7 illustrates exemplary switching device audio-visual data notifying the user(s) that the code has been incorrectly entered and needs to be entered again, according to the embodiment of FIG. 1.
Figure 13:
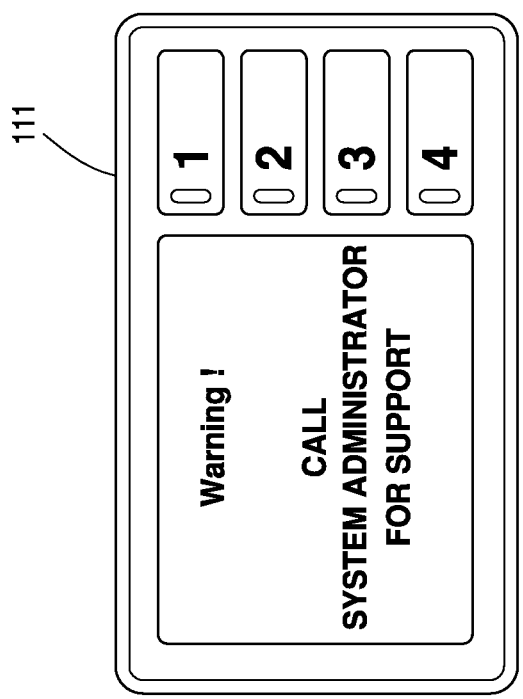
FIG. 13 illustrates exemplary user interface audio-visual data notifying the user(s) to contact the administrator and/or the manufacturer, according to the embodiment of FIG. 1.

When the user(s) incorrectly provide the code presented at user interface 111 (FIG. 1) to KVM switching device 101 (FIG. 1) via control terminal 113 (FIG. 1), virtual port 206 can provide updated switching device audio-visual data at control terminal 113 (FIG. 1) notifying the user(s) that the code has been incorrectly entered and needs to be entered again. If the user(s) provide a wrong code multiple times (e.g., ten times), virtual port 206 can again provide updated switching device audio-visual data notifying the user(s) to contact an administrator and/or a manufacturer of KVM switching device 101 (FIG. 1). FIG. 7 illustrates exemplary switching device audio-visual data notifying the user(s) that the code has been incorrectly entered and needs to be entered again. FIG. 13 illustrates exemplary user interface audio-visual data notifying the user(s) to contact the administrator and/or the manufacturer.

When the user(s) correctly provide the code, KVM switching device 101 (FIG. 1) can erase its memory storage module(s) of any previously paired user interface (e.g., previous configuration settings, codes, flags, etc.). The KVM switching device 101 (FIG. 1) can then be paired with user interface 111 (FIG. 1).

Figure 8:
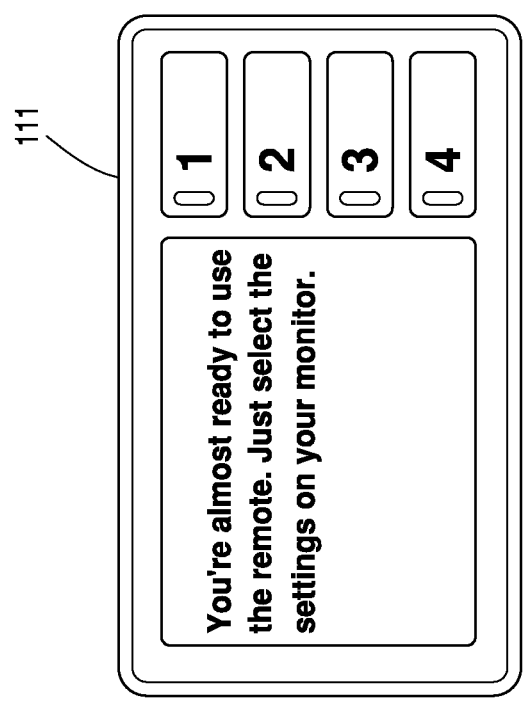
FIG. 8 illustrates exemplary user interface audio-visual data notifying the user(s) that the user interface is nearly ready for use and to configure the user interface at the control terminal, according to the embodiment of FIG. 1.

After pairing with user interface 111 (FIG. 1), KVM switching device 101 (FIG. 1) can be configured to detect whether user interface 111 (FIG. 1) is presently configured. If KVM switching device 101 (FIG. 1) detects user interface 111 (FIG. 1) is presently configured, KVM switching device 101 (FIG. 1) can be configured to switch to a predetermined physical port of physical port(s) 102 (e.g., physical port 202 (FIG. 2)). If, instead, KVM switching device 101 (FIG. 1) detects user interface 111 (FIG. 1) is not presently configured, KVM switching device 101 (FIG. 1) can disable the user interface input(s) of user interface 111 (FIG. 1) until completion of the configuration of user interface 111 (FIG. 1), and virtual port 206 can present switching device audio-visual device at control terminal 113 (FIG. 1). Meanwhile, user interface 111 (FIG. 1) can present user interface audio-visual data notifying the user(s) that user interface 111 (FIG. 1) is nearly ready for use and/or to configure user interface 111 (FIG. 1) at control terminal 113 (FIG. 1) (e.g., via peripheral input device(s) 117). FIG. 8 illustrates exemplary user interface audio-visual data notifying the user(s) that user interface 111 (FIG. 1) is nearly ready for use and to configure user interface 111 (FIG. 1) at control terminal 113 (FIG. 1).

For purposes of configuring user interface 111 (FIG. 1), the switching device audio-visual data present at audio-visual display device 114 can comprise a configuration module configured to permit the user(s) to configure the manner in which the user(s) desire user interface 111 (FIG. 1) to control KVM switching device 101 (FIG. 1) and/or host computer system(s) 102 (FIG. 1). FIG. 9 illustrates an exemplary configuration module displayed at audio-visual display device 114 (FIG. 1). The configuration module can comprise one or more graphical user interface (GUI) inputs by which the user(s) can configure user interface 111 (FIG. 1). The configuration module can permit the user(s) to select which physical port(s) 207 (FIG. 2) are presently, or desired to be, active (e.g., via a check box input). The configuration module can also comprise one or more check boxes indicating whether any of the host computer system(s) 102 (FIG. 1) coupled to physical port(s) 207 (FIG. 2) require CAC access. Likewise, the configuration module can also comprise one or more drop down lists for selecting names and/or colors for each of physical port(s) 207 and/or host computer system(s) 102 (FIG. 1). Finally, the configuration module can also have a GUI input (e.g., a "Done" button) by which the user(s) can affirm that he/she/they are done configuring user interface 111 (FIG. 1).

Figure 11:
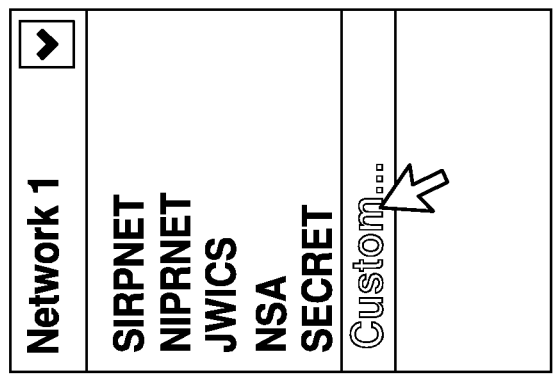
FIG. 11 illustrates an exemplary drop down list of the configuration module of FIG. 9 where the user(s) can select to customize the name of a physical port.
Figure 12:
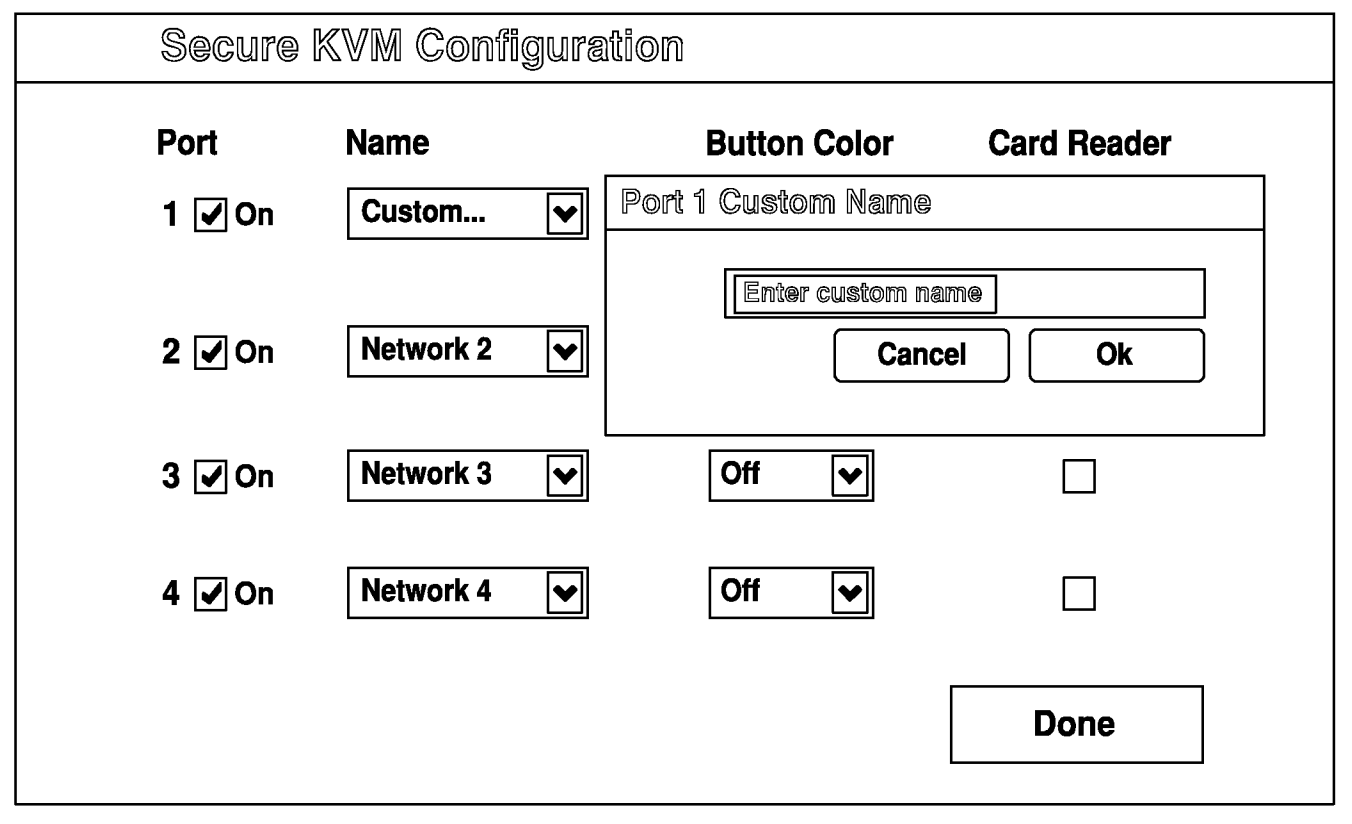

In some embodiments, the user(s) can deactivate one or more physical ports of physical port(s) 207 (FIG. 2). FIG. 10 illustrates an exemplary configuration module displayed at audio-visual display device 114 where a physical port (e.g., physical port 204) has been disabled. In many embodiments, the user(s) can customize the name of any physical port of physical port(s) 207. The user(s) can selected the customized name of the physical port by selecting an appropriate entry from the name drop down list of that physical port at the configuration module. FIG. 11 illustrates an exemplary drop down list where the user(s) can select to customize the name of a physical port. Selecting the appropriate entry can cause a customization window to appear at the configuration module whereby the user(s) can provide the customized name using peripheral input device(s) 117. FIG. 12 illustrates an exemplary customization window whereby the user(s) can customize the name of a physical port. When the user(s) select a new customized name, the new customized name can replace a previous customized name.

In some embodiments, the configuration module can provide another drop down list for selecting how much time (e.g., 4 hours, 8 hours, 11, hours, and/or always) to light up an electronic display of user interface 111 (FIG. 1), if applicable.

In further embodiments, KVM switching device 101 (FIG. 1) can be configured to receive a configuration input from the user(s) prompting KVM switching device 101 (FIG. 1) to configure and/or re-configure user interface 111 (FIG. 1). In some embodiments, KVM switching device 101 (FIG. 1) can be configured to receive the configuration input upon completion of pairing with user interface 111 (FIG. 1). In the same or different embodiments, the user(s) can provide the configuration input by pressing a configuration input mechanism (e.g., a pin-hole mechanical button) of user interface 111 (FIG. 1). In these embodiments, the user(s) may have to depress the configuration input mechanism for a specified amount of time (e.g., five seconds). The configuration module can be configured to provide default names and/or colors for physical port(s) 207 and/or host computer system(s) 102 where the user(s) do not select otherwise.

Figure 19:
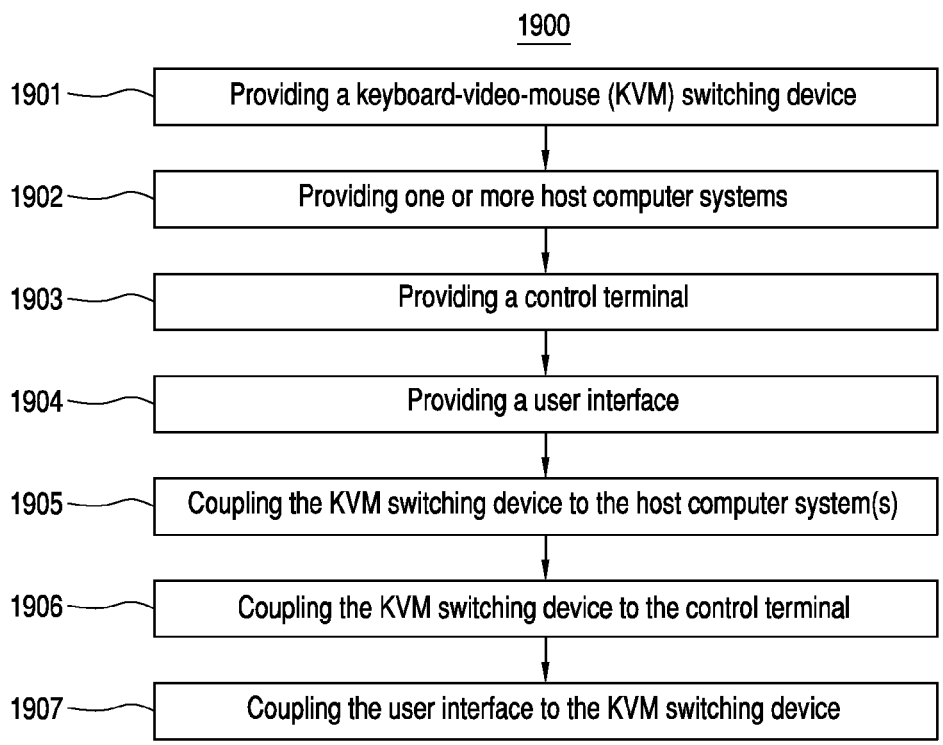
FIG. 19 illustrates a flow chart for an embodiment of another method.

Skipping ahead now in the figures, FIG. 19 illustrates a flow chart for an embodiment of method 1900. Method 1900 is merely exemplary and is not limited to the embodiments presented herein. Method 1900 can be employed in many different embodiments or examples not specifically depicted or described herein. In some embodiments, the procedures, the processes, and/or the activities of method 1900 can be performed in the order presented. In other embodiments, the procedures, the processes, and/or the activities of the method 1900 can be performed in any other suitable order. In still other embodiments, one or more of the procedures, the processes, and/or the activities in method 1900 can be combined or skipped.

Method 1900 can comprise procedure 1901 of providing a keyboard-video-mouse (KVM) switching device. The KVM switching device can be similar or identical to KVM switching device 101 (FIG. 1).

Method 1900 can comprise procedure 1902 of providing one or more host computer systems. The host computer system(s) can be similar or identical to host computer system(s) 102 (FIG. 1).

Method 1900 can comprise procedure 1903 of providing a control terminal. The control terminal can be similar or identical to all or part of control terminal 113 (FIG. 1).

Method 1900 can comprise procedure 1904 of providing a user interface. The user interface can be similar or identical to user interface 111 (FIG. 1).

Method 1900 can comprise procedure 1905 of coupling the KVM switching device to the host computer system(s). Method 1900 can also comprise procedure 1906 of coupling the KVM switching device to the control terminal, and method 1900 can further comprise procedure 1907 of coupling the user interface to the KVM switching device.

Returning again to the figures, FIG. 16 illustrates a flow chart for an embodiment of method 1600. In some embodiments, method 1600 can be implemented by executing one or more computer instructions configured to be run on one or more processors and to be stored on one or more storage modules of a computer system. The computer system can be similar or identical to computer system 1700 (FIG. 17) and/or the virtual port computer system described above with respect to system 100 (FIG. 1). Method 1600 is merely exemplary and is not limited to the embodiments presented herein. Method 1600 can be employed in many different embodiments or examples not specifically depicted or described herein. In some embodiments, the procedures, the processes, and/or the activities of method 1600 can be performed in the order presented. In other embodiments, the procedures, the processes, and/or the activities of method 1600 can be performed in any other suitable order. In still other embodiments, one or more of the procedures, the processes, and/or the activities in method 1600 can be combined or skipped.

Figure 20:
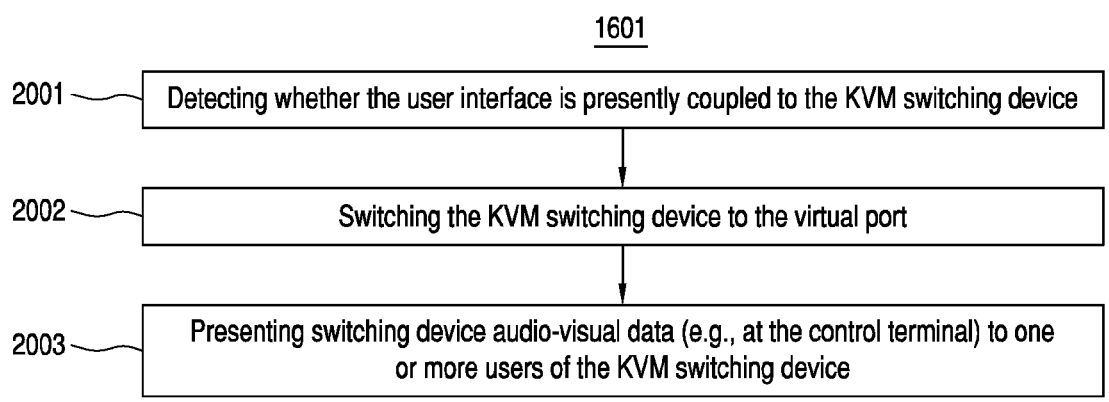
FIG. 20 illustrates an exemplary procedure of coupling a user interface to a keyboard-video-mouse (KVM) switching device.

Method 1600 can comprise procedure 1601 of coupling a user interface to a keyboard-video-mouse (KVM) switching device. The KVM switching device is configured to route host computer audio-visual data from one or more host computer systems to a control terminal and the KVM switching device comprises a virtual port. The user interface can be similar or identical to user interface 111 (FIG. 1), the KVM switching device can be similar to KVM switching device 101 (FIG. 1), the host computer system(s) can be similar or identical to host computer system(s) 102, the control terminal can be similar or identical to all or part of control terminal 113 (FIG. 1), the virtual port can be similar or identical to virtual port 206 (FIG. 2), and/or the host computer audio-visual data can be similar or identical to the host computer audio-visual data described above with respect to system 100 (FIG. 1). In many embodiments, procedure 1601 of coupling the user interface to the KVM switching device can be performed similarly to as described above with respect to system 100 (FIGS. 1 & 2). FIG. 20 illustrates an exemplary procedure 1601.

Referring to FIG. 20, procedure 1601 can comprise process 2001 of detecting whether the user interface is presently coupled to the KVM switching device. If upon or after performing process 2001, no user interface is detected, procedure 1601 can continue with process 2002 of switching the KVM switching device to the virtual port. After performing process 2002, procedure 1601 can comprise process 2003 of presenting switching device audio-visual data (e.g., at the control terminal) to one or more users of the KVM switching device, where the switching device audio-visual data instructs the user(s) to couple the user interface to the KVM switching device. Process 2001, process 2002, and/or process 2003 can be repeated until the user interface is detected upon performing process 2001. Upon initially performing process 2001, if the user interface is detected, then process 2002 and/or process 2003 can be omitted.

Figure 21:
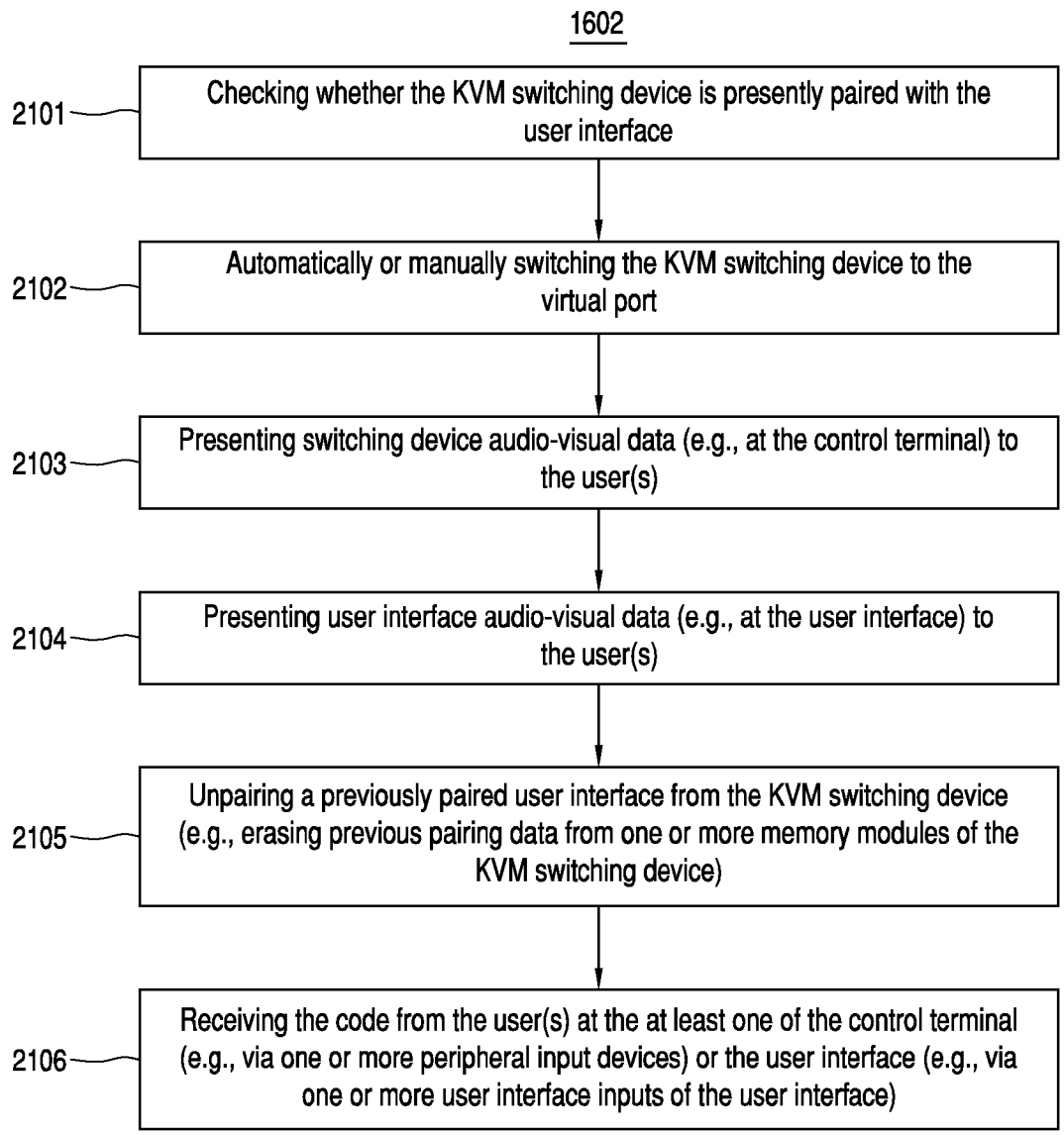
FIG. 21 illustrates an exemplary procedure of pairing the user interface to the KVM switching device using a virtual port of the KVM switching device, according to the embodiment of FIG. 16.

Referring again to FIG. 16, method 1600 can continue with procedure 1602 of pairing the user interface to the KVM switching device using the virtual port of the KVM switching device. In many embodiments, procedure 1602 of pairing the user interface to the KVM switching device can be performed in a manner similar to that described above with respect to system 100 (FIGS. 1 & 2). FIG. 21 illustrates an exemplary procedure 1602.

Referring to FIG. 21, procedure 1602 can comprise process 2101 of checking whether the KVM switching device is presently paired with the user interface. If upon or after performing process 2101, the KVM switching device and the user interface are determined to not be presently paired, procedure 1601 can continue with process 2102 of automatically or manually switching the KVM switching device to the virtual port. Procedure 1602 can continue with process 2103 of presenting switching device audio-visual data (e.g., at the control terminal) to the user(s), where the switching device audio-visual data instructs the user(s) to provide a code presented by the user interface via the user interface and/or the control terminal. Meanwhile, procedure 1602 can also comprise process 2104 of presenting user interface audio-visual data (e.g., at the user interface) to the user(s), where the user interface audio-visual data comprises the code. In some embodiments, process 2104 can be performed after or approximately simultaneously with process 2103. The user interface audio-visual data can be stored in a memory module of the user interface.

Procedure 1602 can comprise process 2105 of unpairing a previously paired user interface from the KVM switching device (e.g., erasing previous pairing data from one or more memory modules of the KVM switching device). Process 2105 can be performed after or approximately simultaneously with process 2101, process 2102, process 2103, and/or process 2104.

Procedure 1602 can continue with process 2106 of receiving the code from the user(s) at the at least one of the control terminal (e.g., via one or more peripheral input devices) or the user interface (e.g., via one or more user interface inputs of the user interface). The peripheral input device(s) can be similar or identical to peripheral input device(s) 117 (FIG. 1). The user interface input(s) can be similar or identical to the user interface input(s) described above with respect to system 100 (FIG. 1). Procedure 1602 can continue further with a process of comparing the code received from the user(s) against the code of the user interface audio-visual data. If after or upon performing the process of comparing the code received from the user(s) against the code of the user interface audio-visual data, the codes do not match, then procedure 1602 can continue with a process of presenting switching device audio-visual data, where the switching device audio-visual data instructs the user(s) to re-enter the code presented at the user interface via the user interface and/or the control terminal. If the codes match, the process of presenting switching device audio-visual data, where the switching device audio-visual data instructs the user(s) to re-enter the code presented at the user interface via the user interface and/or the control terminal can be omitted from procedure 1602.

Figure 22:
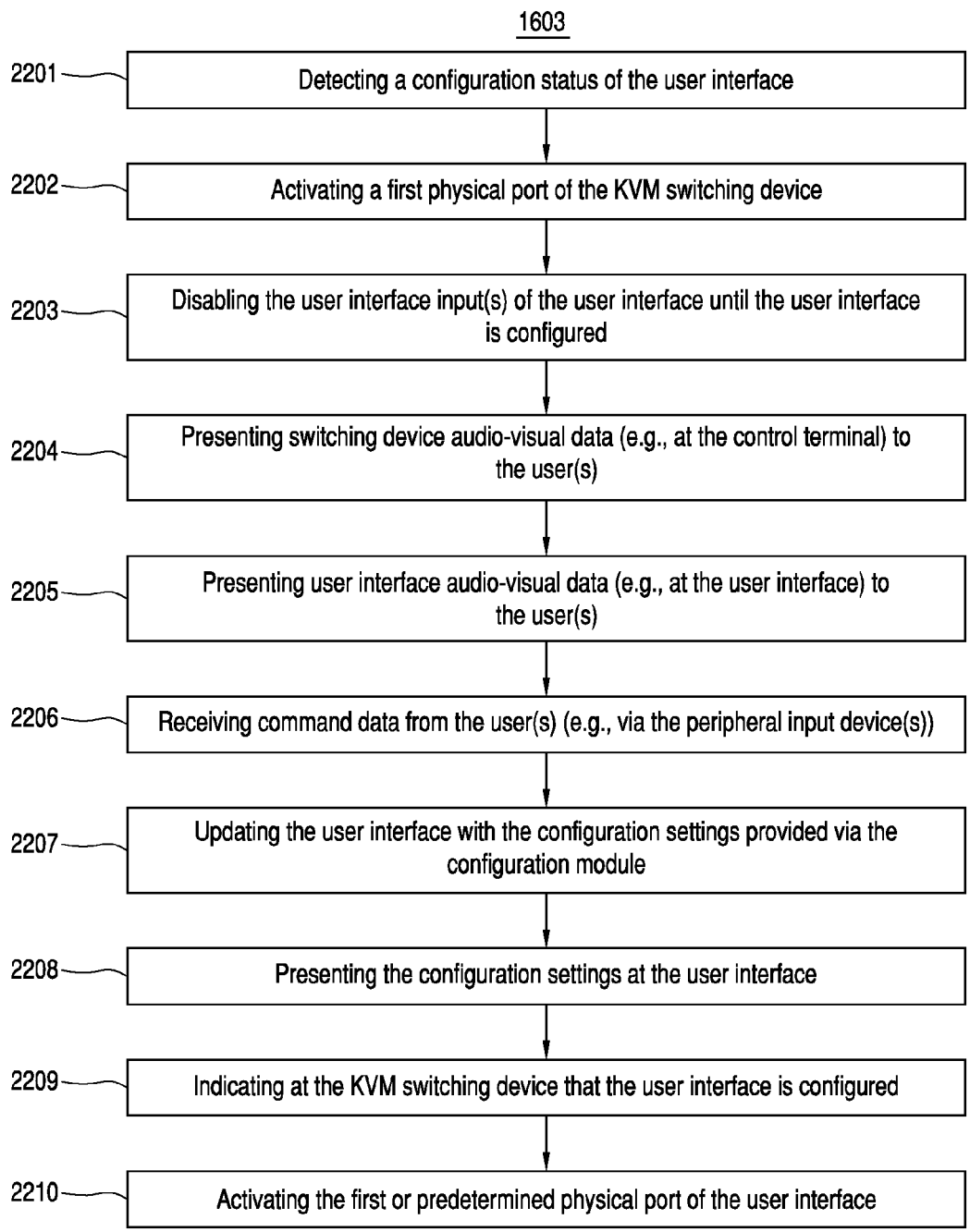
FIG. 22 illustrates an exemplary procedure of configuring the user interface to permit the user interface to control the KVM switching device using the virtual port, according to the embodiment of FIG. 16.

Continuing with FIG. 16, method 1600 can proceed with procedure 1603 of configuring the user interface to permit the user interface to control the KVM switching device using the virtual port, which can occur after the KVM switching device is paired with the user interface. In many embodiments, procedure 1603 of configuring the user interface to permit the user interface to control the KVM switching device can be performed in a manner similar to that described above with respect to system 100 (FIGS. 1 & 2). FIG. 22 illustrates an exemplary procedure 1603.

Procedure 1603 can comprise process 2201 of detecting a configuration status of the user interface. If when performing process 2201, the configuration status indicates that the user interface is already configured to control the KVM switching device, procedure 1603 can continue with process 2202 of activating a first physical port of the KVM switching device. Performing process 2202 can comprise an activity of routing host computer audio-visual data of a first or predetermined host computer system of the host computer system(s) that is coupled to the first physical port to the control terminal. The first host computer system can be similar or identical to host computer system 103 (FIG. 1). The first physical port can be similar or identical to physical port 202 (FIG. 2). In those embodiments where process 2202 is performed, one or more of processes 2203-2210, as described below, can be omitted from procedure 1603.

If, when performing process 2201, the configuration status indicates that the user interface is not already configured to control the KVM switching device, procedure 1603 can continue with process 2203 of disabling the user interface input(s) of the user interface until the user interface is configured. Then, procedure 1603 can continue with process 2204 of presenting switching device audio-visual data (e.g., at the control terminal) to the user(s), where the switching device audio-visual data comprises a configuration module (e.g., an onscreen configuration module) displayed by the control terminal and configured to accept command data from the peripheral input device(s)) configured to permit the user(s) to configure (e.g., using the peripheral input device(s)) the manner in which the user interface controls the KVM switching device with respect to the host computer system(s). In those embodiments where one or more of processes 2203-2210 are performed, process 2202 can be omitted from procedure 1603.

Procedure 1603 can comprise optional process 2205 of presenting user interface audio-visual data (e.g., at the user interface) to the user(s), where the user interface notifies the user(s) that the user interface is almost configured (e.g., ready for use). Process 2205 can be performed after or approximately simultaneously with process 2203 and/or process 2204.

Procedure 1603 can comprise a process of receiving command data from the user(s) (e.g., via the peripheral input device(s)), where the command data comprises one or more configuration settings (e.g., numbers, names, symbols, and/or colors associated with the user interface input(s), the physical port(s) of the user interface, and/or the host computer system(s) as described above with respect to system 100 (FIGS. 1 & 2)) for the user interface provided via the configuration module. This process can be performed after process 2205 and/or before process 2206, as described below.

Procedure 1603 can comprise process 2206 of receiving command data from the user(s) (e.g., via the peripheral input device(s)), where the command data comprises affirmation that the user(s) are finished configuring the user interface. Process 2206 can be performed after one or more of processes 2202-2205 are performed.

Procedure 1603 can comprise process 2207 of updating the user interface with the configuration settings provided via the configuration module. Process 2207 can comprise receiving command data from the user(s) (e.g., via the peripheral input device(s)), where (e.g., after or approximately simultaneously as provided) the command data comprises one or more configuration settings for the user interface provided via the configuration module.

Procedure 1603 can comprise process 2208 of presenting the configuration settings at the user interface. Procedure 1603 can continue with process 2209 of indicating at the KVM switching device that the user interface is configured. Procedure 1603 can continue with process 2210 of activating the first or predetermined physical port of the user interface. Process 2210 can be similar or identical to process 2202, as described above.

Referring again to FIG. 16, method 1600 can comprise procedure 1604 of turning on the KVM switching device. Procedure 1604 can be performed before performing one or more of procedures 1601-1603.

Figure 29:
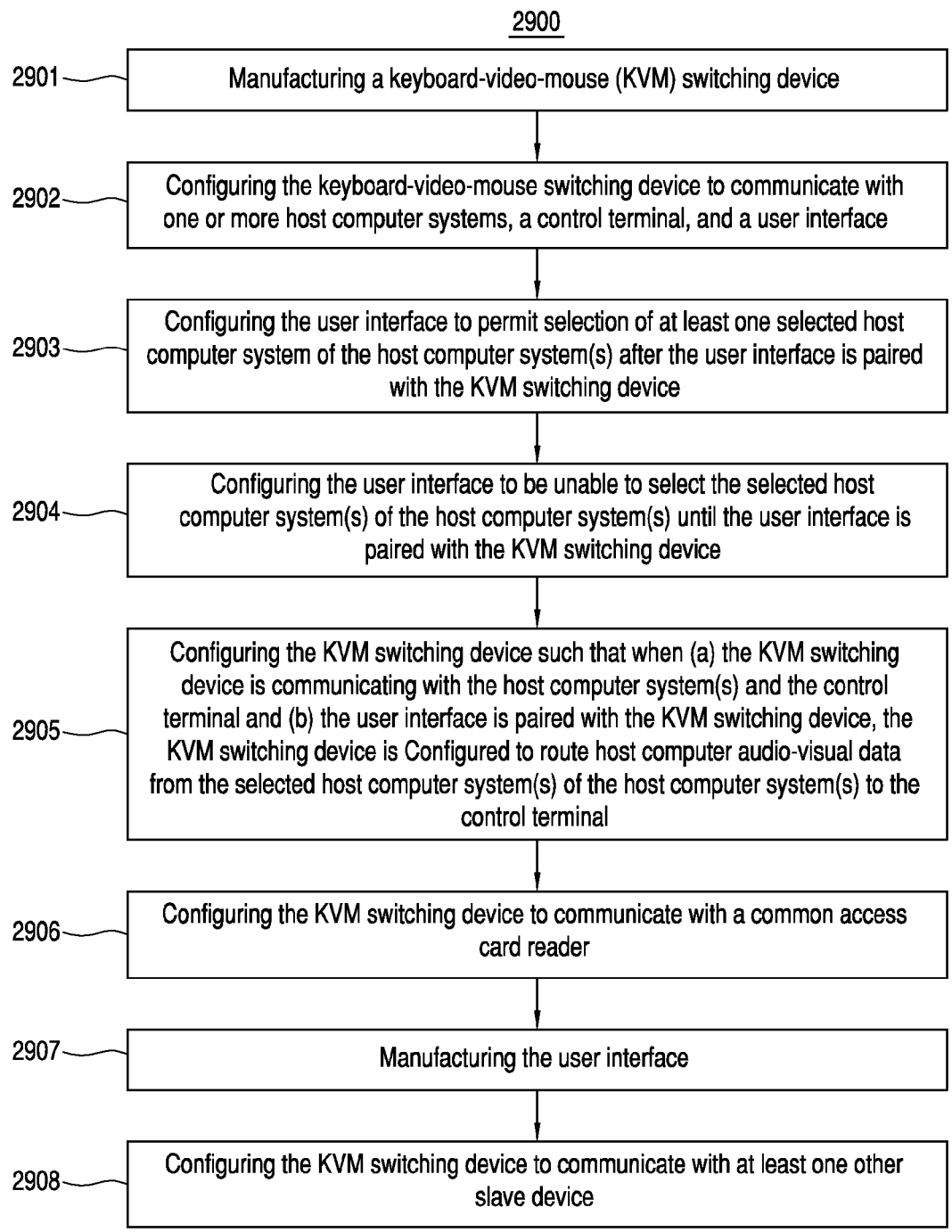
FIG. 29 illustrates a flow chart for an embodiment of a method.

Skipping ahead again in the drawings, FIG. 29 illustrates a flow chart for an embodiment of method 2900. Method 2900 is merely exemplary and is not limited to the embodiments presented herein. Method 2900 can be employed in many different embodiments or examples not specifically depicted or described herein. In some embodiments, the procedures, the processes, and/or the activities of method 2900 can be performed in the order presented. In other embodiments, the procedures, the processes, and/or the activities of the method 2900 can be performed in any other suitable order. In still other embodiments, one or more of the procedures, the processes, and/or the activities in method 2900 can be combined or skipped.

Method 2900 can comprise activity 2901 of manufacturing a keyboard-video-mouse (KVM) switching device. The KVM switching device can be similar or identical to KVM switching device 101 (FIG. 1). In some embodiments, performing activity 2901 can comprise configuring one or more physical ports of the KVM switching device to be disabled until a user interface is paired with the KVM switching device. The physical port(s) can be similar or identical to physical port(s) 207 (FIG. 2), and the user interface can be similar or identical to user interface 111 (FIG. 1).

Method 2900 can comprise activity 2902 of configuring the keyboard-video-mouse switching device to communicate with one or more host computer systems, a control terminal, and the user interface. The host computer system(s) can be similar or identical to host computer system(s) 102 (FIG. 1), and the control terminal can be similar or identical to control terminal 113 (FIG. 1). In some embodiments, activity 2902 can comprise configuring the user interface to communicate with the KVM switching device through at least one of wired or wireless communication.

Method 2900 can comprise activity 2903 of configuring the user interface to permit selection of at least one selected host computer system of the host computer system(s) after the user interface is paired with the KVM switching device.

Method 2900 can comprise activity 2904 of configuring the user interface to select the selected host computer system(s) of the host computer system(s) until the user interface is paired with the KVM switching device.

Method 2900 can comprise activity 2905 of configuring the KVM switching device such that when (a) the KVM switching device is communicating with the host computer system(s) and the control terminal and (b) the user interface is paired with the KVM switching device, the KVM switching device is configured to route host computer audio-visual data from the selected host computer system(s) of the host computer system(s) to the control terminal. In many embodiments, one or more of activities 2903 through 2905 can be performed as part of activity 2901.

Method 2900 can comprise activity 2906 of configuring the KVM switching device to communicate with a common access card reader. The common access card reader can be similar or identical to common access card reader 121 (FIG. 1).

Figure 30:
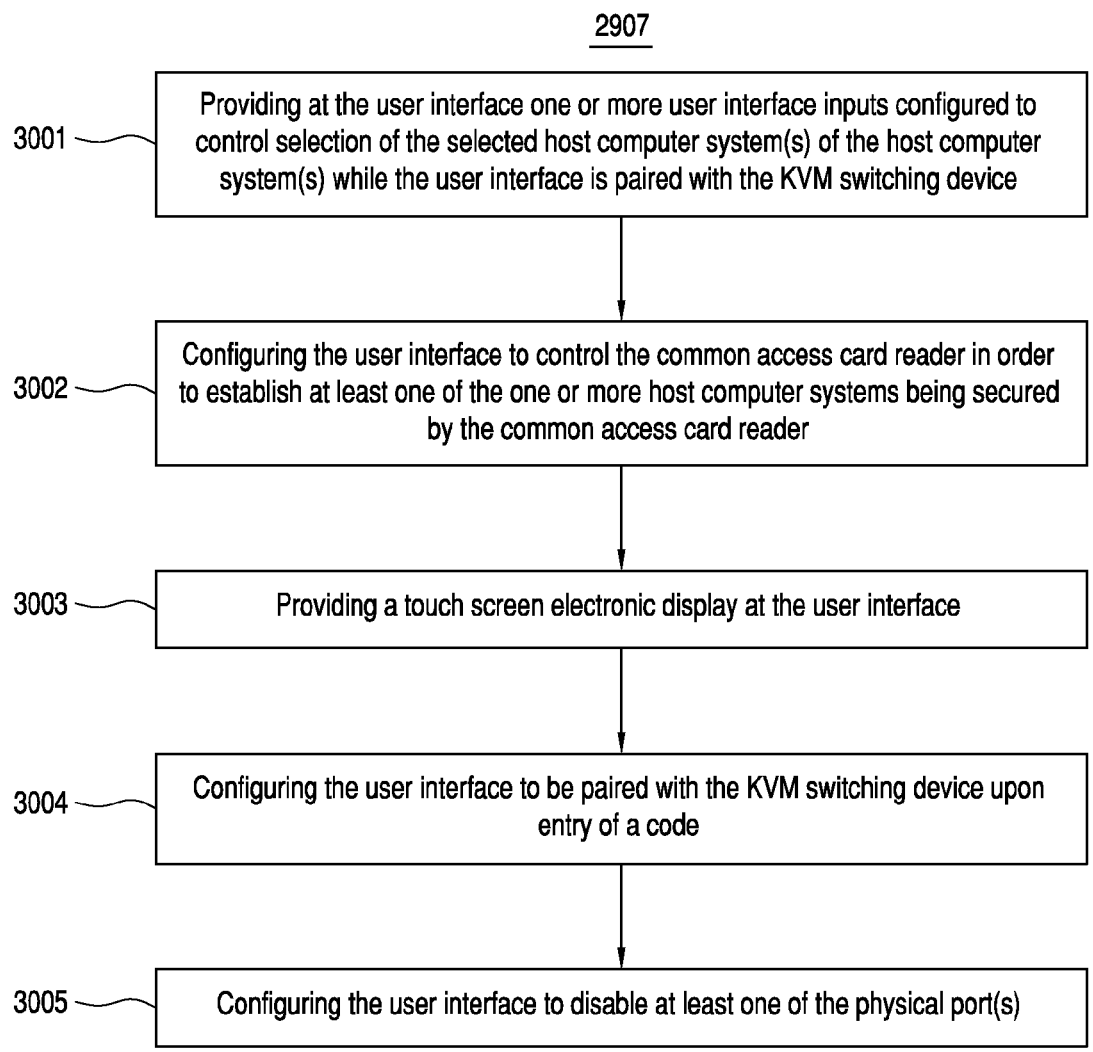
FIG. 30 illustrates an exemplary activity of manufacturing a user interface, according to the embodiment of FIG. 29.

Method 2900 can comprise activity 2907 of manufacturing the user interface. In some embodiments, activity 2907 can be omitted. In other embodiments, one or more activities 2901 through 2906 and/or activity 2908 can be omitted. FIG. 30 illustrates an exemplary activity 2907.

Referring to FIG. 30, activity 2907 can comprise activity 3001 of providing at the user interface one or more user interface inputs configured to control selection of the selected host computer system(s) of the host computer system(s) while the user interface is paired with the KVM switching device. The user interface input(s) can be similar or identical to the user interface input(s) described above with respect to system 100 (FIG. 1). In some embodiments, performing activity 3101 can comprise manufacturing one or more mechanical buttons comprising one or more color chips.

Further, activity 2907 can comprise activity 3002 of configuring the user interface to control the common access card reader in order to establish at least one of the one or more host computer systems being secured by the common access card reader.

Activity 2907 can comprise activity 3003 of providing a touch screen electronic display at the user interface. The touch screen electronic display can be similar to the touch screen electronic display described above with respect to user interface 111 (FIG. 1).

Activity 2907 can comprise activity 3004 of configuring the user interface to be paired with the KVM switching device upon entry of a code.

Activity 2907 can comprise activity 3005 of configuring the user interface to disable at least one of the physical port(s).

Returning now to FIG. 29, method 2900 can comprise activity 2908 of configuring the KVM switching device to communicate with at least one other slave device. The other slave device(s) can be similar or identical to the other slave device(s) described above with respect to system 100 (FIG. 1).

In many embodiments, one or more of activities 2901 through 2908 can be performed simultaneously with one or more other of activities 2901 through 2908. Further, one or more of activities 3001 (FIG. 30) through 3005 (FIG. 30) can be performed simultaneously with one or more other of activities 3001 through 3005.

Turning ahead in the drawings, FIG. 31 illustrates a flow chart for an embodiment of method 3100. In some embodiments, at least part of method 3100 can be implemented by executing one or more computer instructions configured to be run on one or more processors and to be stored on one or more storage modules of at least one computer system. The computer system(s) can be similar or identical to computer system 1700 (FIG. 17) and/or the virtual port computer system described above with respect to system 100 (FIG. 1). Method 3100 is merely exemplary and is not limited to the embodiments presented herein. Method 3100 can be employed in many different embodiments or examples not specifically depicted or described herein. In some embodiments, the procedures, the processes, and/or the activities of method 3100 can be performed in the order presented. In other embodiments, the procedures, the processes, and/or the activities of method 3100 can be performed in any other suitable order. In still other embodiments, one or more of the procedures, the processes, and/or the activities in method 3100 can be combined or skipped.

Method 3100 can comprise activity 3101 of detecting a user interface at a virtual port of a keyboard-video-mouse (KVM) switching device when the user interface is coupled with the KVM switching device. The virtual port can be similar or identical to virtual port 207 (FIG. 2); the KVM switching device can be similar or identical to KVM switching device 101 (FIG. 1); and the user interface can be similar or identical to user interface 111 (FIG. 1).

Method 3100 can comprise activity 3102 of pairing the user interface to the KVM switching device. In some embodiments, performing activity 3102 can comprise receiving a code at one of the user interface or a control terminal. The control terminal can be similar or identical to control terminal 113 (FIG. 1). In many embodiments, activity 3102 can occur after activity 3101.

Method 3100 can comprise activity 3103 of receiving a selection of at least one selected host computer system of one or more host computer systems at the KVM switching device via one or more user interface inputs of the user interface when the user interface is paired with the KVM switching device. In many embodiments, activity 3103 occurs after activity 3101 and/or 3102. The host computer system(s) can be similar or identical to host computer system(s) 102 (FIG. 1), and the user interface input(s) can be similar or identical to the user interface input(s) described above with respect to system 100 (FIG. 1).

Method 3100 can comprise activity 3104 of disabling communication of the KVM switching device with the host computer system(s). In many embodiments, activity 3104 can occur before and/or after one or more of activities 3101 through 3103. In further embodiments, activity 3104 can be repeated one or more times.

Method 3100 can comprise activity 3105 of receiving a configuration of the user interface input(s) associating the user interface input(s) with the host computer system(s). In many embodiments, activity 3105 can be performed prior to activity 3103 and/or after activities 3101 and/or 3102.

Method 3100 can comprise activity 3106 of receiving a configuration of one or more physical ports of the KVM switching device at the user interface establishing that at least one of the physical port(s) is to be secured by a common access card reader. The physical port(s) can be similar or identical to physical port(s) 206 (FIG. 2), and the common access card reader can be similar or identical to common access card reader 121 (FIG. 1). In many embodiments, activity 3106 can be performed as part of activity 3105, and vice versa. Further, in some embodiments, activities 3105 and 3106 can be performed approximately simultaneously.

Method 3100 can comprise activity 3107 of providing first instructions at the user interface regarding pairing the user interface with the KVM switching device. In some embodiments, performing activity 3107 can comprise providing the first instructions at an electronic display of the user interface. The electronic display can be similar or identical to the electronic display described above with respect to user interface 111 (FIG. 1). In many embodiments, activity 3107 can occur after activity 3101 and/or before activity 3102.

Method 3100 can comprise activity 3108 of providing second instructions at the user interface regarding configuring the one or more user interface inputs of the user interface. In some embodiments, performing activity 3108 can comprise providing the second instructions at the electronic display of the user interface. In many embodiments, activity 3107 can occur after activity 3102 and/or before activity 3103.

Method 3100 can comprise activity 3109 of receiving a second selection of at least one other selected host computer system of the host computer system(s) at the KVM switching device via the user interface inputs of the user interface when the user interface is paired with the KVM switching device. In many embodiments, activity 3109 can occur after one or more of activities 3101 through 3108.

For any of the embodiments disclosed herein, it can be appreciated that any of the audio-visual data can comprise video data and/or audio data, as appropriate. For example, although many of the examples above are discussed with respect to presenting audio-visual data visually, many embodiments could also be implemented with audible audio-visual data instead or as well.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that methods 1600 (FIG. 16), 1900 (FIG. 19), 2900 (FIG. 29), and/or 3100 (FIG. 31), and the related procedures, process, and/or activities of each, may be comprised of many different procedures, processes, and activities and be performed by many different modules, in many different orders, that any element of FIGS. 1-31 may be modified, and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
 a keyboard-video-mouse switching device configured to communicate with one or more host computer systems, a control terminal, and a user interface;
 wherein:
  the keyboard-video-mouse switching device comprises a virtual port through which the user interface communicates with the keyboard-video-mouse switching device and one or more physical ports through which the one or more host computer systems communicate with the keyboard-video-mouse switching device;
  the user interface is configured to permit selection of at least one selected host computer system of the one or more host computer systems after the user interface is paired with the keyboard-video-mouse switching device;

the user interface is unable to select the at least one selected host computer system of the one or more host computer systems until the user interface is paired with the keyboard-video-mouse switching device; and when the keyboard-video-mouse switching device is communicating with the one or more host computer systems and the control terminal and when the user interface is paired with the keyboard-video-mouse switching device, the keyboard-video-mouse switching device is configured to route host computer audio-visual data from the at least one selected host computer system of the one or more host computer systems to the control terminal;

the keyboard-video-mouse switching device and the user interface are configured to communicate with a common access card reader; and the common access card reader is configured to secure at least one of the one or more host computer systems by requiring authentication of a common access card at the common access card reader before the keyboard-video-mouse switching device is able to route the host computer audio-visual data from the at least one selected host computer system to the control terminal if the at least one selected host computer system comprises the at least one of the one or more host computer systems being secured by the common access card reader.

2. The system of claim 1 wherein:
the user interface is separate from the control terminal even when being located proximate to the control terminal.

3. The system of claim 1 wherein:
the user interface comprises one or more user interface inputs configured to control the selection of the at least one selected host computer system of the one or more host computer systems while the user interface is paired with the keyboard-video-mouse switching device; and
each of the one or more user interface inputs is configured to be associated with one of the one or more host computer systems as configured by a user of the system.

4. The system of claim 3 wherein:
the one or more user interface inputs comprise one or more mechanical buttons comprising one or more color chips.

5. The system of claim 1 wherein:
the user interface is configured to control the common access card reader to secure the at least one of the one or more host computer systems with the common access card reader.

6. The system of claim 1 further comprising at least one of:
the user interface.

7. A method comprising:
manufacturing a keyboard-video-mouse switching device comprising a virtual port and one or more physical ports;
configuring the keyboard-video-mouse switching device to communicate with one or more host computer systems, a control terminal, and a user interface, the keyboard-video-mouse switching device being configured to communicate with the user interface through the virtual port and to communicate with the one or more host computer systems through the one or more physical ports;
configuring the user interface to permit selection of at least one selected host computer system of the one or more host computer systems after the user interface is paired with the keyboard-video-mouse switching device;

configuring the user interface to be unable to select the at least one selected host computer system of the one or more host computer systems until the user interface is paired with the keyboard-video-mouse switching device;

configuring the keyboard-video-mouse switching device such that when (a) the keyboard-video-mouse switching device is communicating with the one or more host computer systems and the control terminal and (b) the user interface is paired with the keyboard-video-mouse switching device, the keyboard-video-mouse switching device is configured to route host computer audio-visual data from the at least one selected host computer system of the one or more host computer systems to the control terminal; and configuring the keyboard-video-mouse switching device to communicate with a common access card reader, the common access card reader being configured to communicate with the user interface and to secure at least one of the one or more host computer systems by requiring authentication of a common access card at the common access card reader before the keyboard-video-mouse switching device is able to route the host computer audio-visual data from the at least one selected host computer system to the control terminal if the at least one selected host computer system comprises the at least one of the one or more host computer systems being secured by the common access card reader.

8. The method of claim 7 further comprising:
manufacturing the user interface.

9. The method of claim 8 wherein:
manufacturing the user interface comprises providing at the user interface one or more user interface inputs configured to control the selection of the at least one selected host computer system of the one or more host computer systems while the user interface is paired with the keyboard-video-mouse switching device, each of the one or more user interface inputs being configured to be associated with a different one of the one or more host computer systems as configured by a user of the keyboard-video-mouse switching device.

10. The method of claim 9 wherein:
providing at the user interface the one or more user interface inputs comprises manufacturing one or more mechanical buttons comprising one or more color chips.

11. The method of claim 8 wherein at least one of:
manufacturing the user interface comprises configuring the user interface to control the common access card reader to secure the at least one of the one or more host computer systems with the common access card reader;
manufacturing the keyboard-video-mouse switching device comprises configuring the one or more physical ports to be disabled until the user interface is paired with the keyboard-video-mouse switching device;
manufacturing the user interface comprises providing a touch screen electronic display at the user interface;
the method further comprises configuring the keyboard-video-mouse switching device to communicate with at least one other slave device, where the common access card reader comprises a slave device;
manufacturing the user interface comprises configuring the user interface to be paired with the keyboard-video-mouse switching device upon entry of a code; or manufacturing the user interface comprises configuring the user interface to disable at least one of the one or more physical ports.

12. The system of claim 1 wherein:
the one or more physical ports are configured to be disabled until the user interface is paired with the keyboard-video-mouse switching device.

13. The system of claim 1 wherein:
the user interface comprises a touch screen electronic display.

14. The system of claim 1 wherein:
the common access card reader is a slave device, and the keyboard-video-mouse switching device is configured to communicate with at least one other slave device.

15. The system of claim 1 wherein:
the user interface is configured to be paired with the keyboard-video-mouse switching device upon entry of a code.

16. The system of claim 1 wherein:
the user interface is configured to disable at least one of the one or more physical ports.

17. The system of claim 1 further comprising:
the one or more host computer systems.

18. The system of claim 1 further comprising:
the control terminal.

19. The system of claim 1 wherein:
the user interface is configured to control the common access card reader to secure the at least one of the one or more host computer systems with the common access card reader the one or more physical ports are configured to be disabled until the user interface is paired with the keyboard-video-mouse switching device;

the user interface comprises a touch screen electronic display;

the common access card reader is a slave device, and the keyboard-video-mouse switching device is configured to communicate with at least one other slave device;

the user interface is configured to be paired with the keyboard-video-mouse switching device upon entry of a code; and the user interface is configured to disable at least one of the one or more physical ports.

20. The system of claim 1 further comprising:
the user interface;
the one or more host computer systems; and
the control terminal.

* * * * *